United States Patent
Salishev et al.

(10) Patent No.: US 10,057,658 B2
(45) Date of Patent: Aug. 21, 2018

(54) VIDEO WATERMARKING TECHNIQUES

(71) Applicant: Intel Corporation, Santa Clara, CA (US)

(72) Inventors: Sergey Yuogoloth Salishev, Sankt-Peterburg (RU); Alexandra Afanasyeva, Sankt-Peterburg (RU); Evgeny Linsky, Sankt-Peterburg (RU); Denis Ivanov, Sankt-Peterburg (RU); Dmitry Ryzhov, Metallostroy (RU)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/129,917

(22) PCT Filed: Nov. 1, 2013

(86) PCT No.: PCT/IB2013/003140
§ 371 (c)(1),
(2) Date: Dec. 27, 2013

(87) PCT Pub. No.: WO2015/063537
PCT Pub. Date: May 7, 2015

(65) Prior Publication Data
US 2016/0345079 A1 Nov. 24, 2016

(51) Int. Cl.
*H04N 5/913* (2006.01)
*H04N 21/8358* (2011.01)
(Continued)

(52) U.S. Cl.
CPC ......... *H04N 21/8358* (2013.01); *G06F 21/16* (2013.01); *G06F 21/602* (2013.01);
(Continued)

(58) Field of Classification Search
CPC .... H04N 1/3232; H04N 1/4405; H04N 1/448; H04N 5/913; H04N 7/1675;
(Continued)

(56) References Cited

U.S. PATENT DOCUMENTS 6,064,764 A * 5/2000 Bhaskaran ............ G06T 1/0042
382/100
6,957,350 B1 * 10/2005 Demos ...................... H04N 5/14
348/E5.108
(Continued)

FOREIGN PATENT DOCUMENTS

WO 0167667 9/2001

OTHER PUBLICATIONS

Su et al., "A practical design of digital video watermarking for content authentication", Signal Processing: Image Communication, 2011.
(Continued)

*Primary Examiner* — Robert J Hance

(57) ABSTRACT

Improved techniques for video watermarking are described. In one embodiment, for example, an apparatus may comprise a processor circuit and a watermarking module for execution by the processor circuit to generate disabled video content through modification of a video content item, send a common stream comprising the disabled video content, and send a private content key for the disabled video content, the private content key defining a watermark for the video content item. Other embodiments are described and claimed.

15 Claims, 14 Drawing Sheets

(51) Int. Cl.

| | |
|---|---|
| *H04N 19/467* | (2014.01) |
| *G06F 21/60* | (2013.01) |
| *G06F 21/16* | (2013.01) |
| *G06T 1/00* | (2006.01) |
| *H04N 21/4405* | (2011.01) |
| *H04N 7/167* | (2011.01) |
| *H04N 1/32* | (2006.01) |
| *H04N 1/44* | (2006.01) |
| *H04N 21/2347* | (2011.01) |
| *H04N 21/266* | (2011.01) |
| *H04N 21/462* | (2011.01) |

(52) U.S. Cl.
CPC ......... *G06T 1/0021* (2013.01); *H04N 1/3232* (2013.01); *H04N 1/32144* (2013.01); *H04N 1/448* (2013.01); *H04N 1/4493* (2013.01); *H04N 5/913* (2013.01); *H04N 7/1675* (2013.01); *H04N 19/467* (2014.11); *H04N 21/2347* (2013.01); *H04N 21/26613* (2013.01); *H04N 21/4405* (2013.01); *H04N 21/4622* (2013.01); *G06F 2221/0737* (2013.01); *G06T 2201/005* (2013.01); *H04L 2209/608* (2013.01); *H04N 2005/91335* (2013.01)

(58) Field of Classification Search
CPC ..... H04N 2005/91335; H04N 21/2347; H04N 21/4405; H04N 1/32144; H04N 1/4493; G06T 1/0021; G06T 2001/005; G06F 21/602

See application file for complete search history.

(56) References Cited

U.S. PATENT DOCUMENTS

| | | | | |
|---|---|---|---|---|
| 2002/0118862 | A1* | 8/2002 | Sugimoto | G06T 7/20 382/103 |
| 2004/0223612 | A1* | 11/2004 | Kamijoh | G06T 1/0085 380/201 |
| 2005/0111558 | A1* | 5/2005 | Lecomte | H04N 5/913 375/240.29 |
| 2005/0213760 | A1 | 9/2005 | Lecomte et al. | |
| 2010/0313030 | A1* | 12/2010 | Yang | H04N 7/163 713/176 |

OTHER PUBLICATIONS

Qiu et al., "A hybrid watermarking scheme for H.24/AVC video", Proceeding ICPR'04 Proceedings of the Pattern Recognition, 17th International Conference on (ICPR'04), vol. 4.

Zou et al., "H.264/AVC Stream Replacement Technique for Video Watermarking", IEEE International Conference on Acoustics, Speech and Signal Processing, ICASSP 2008, 4 pages.

Barni et al., "A DCT—domain system for robust image watermarking" Signal processing 66,1998—Elsevier Science BV, (1998), pp. 357-372.

Nuiuda et al., "An improvement of discrete Tardos fingerprinting codes", 2009, Des.Codes, 26 pages.

Zou et al., "Compressed video stream watermarking for peer-to-peer based content distribution network", ICME 2009, pp. 1390-1393.

International Search Report and Written Opinion received for PCT Patent Application No. PCT/IB2013/003140, dated Jul. 2, 2014, 11 pages.

* cited by examiner

VIDEO WATERMARKING TECHNIQUES

BACKGROUND

In order to combat unauthorized copying, redistribution, and/or other types of piracy of video content that they distribute, content distribution networks may employ watermarking techniques. Generally speaking, such techniques involve embedding information into distributed video content. More particularly, some conventional watermarking techniques involve embedding information by modifying image data associated with the video content such that the modifications convey information according to a defined scheme but are not readily discernable by content consumers.

Although such watermarks may not be readily discernable by content consumers, they may still be vulnerable to various types of attacks, such as downsampling, downscaling, and/or transcoding, which are designed to remove watermarks or render them unrecognizable. Watermarking techniques that are more resistant to such attacks than conventional techniques may be desirable. Additionally, there may be significant processing and/or communications overhead associated with watermarking according to conventional techniques, especially those that involve the application of fingerprints or other types of unique watermarks. Watermarking techniques that involve reduced amounts of processing and/or communications overhead may also be desirable.

DETAILED DESCRIPTION

Various embodiments may be generally directed to improved techniques for video watermarking. More particularly, various embodiments are directed to video watermarking techniques that are more resistant to attack, and/or that involve reduced amounts of processing and/or communications overhead. In one embodiment, for example, an apparatus may comprise a processor circuit and a watermarking module for execution by the processor circuit to generate disabled video content through modification of a video content item, send a common stream comprising the disabled video content, and send a private content key for the disabled video content, the private content key defining a watermark for the video content item. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
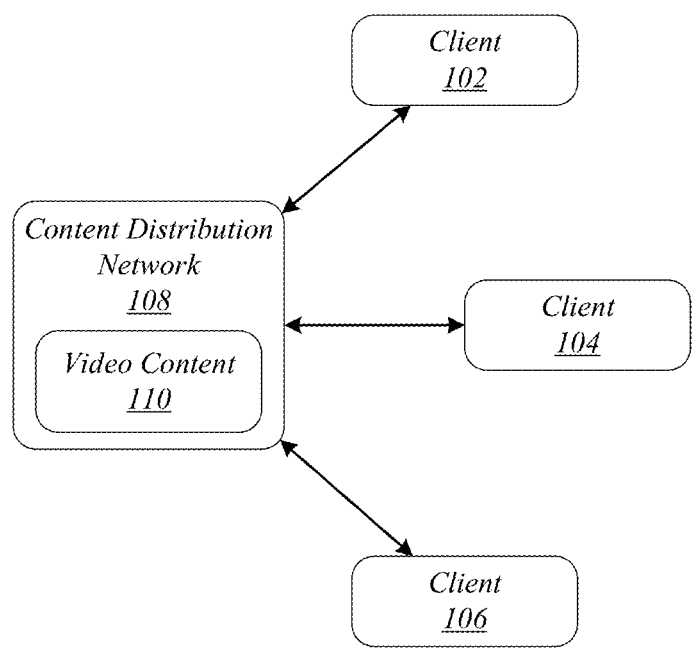
FIG. 1 illustrates one embodiment of an operating environment.

FIG. 1 illustrates an embodiment of an operating environment 100 such as may be associated with various embodiments. As shown in FIG. 1, in operating environment 100, clients 102, 104, and 106 communicate with a content distribution network 108 in order to access video content 110. In some embodiments, for example, content distribution network 108 may comprise a provider of services for on-demand content consumption, and may provide video content 110 to clients 102, 104, and 106 in conjunction with purchase, by respective users of clients 102, 104, and 106, of the rights to view video content 110. In various embodiments, it may be desirable for the content provider associated with content distribution network 108 and/or one or more other entities associated with creation and/or distribution of video content 110 to implement measures to prevent video content 110 from being copied and/or redistributed to users that have not purchased the rights to view video content 110.

One approach to preventing unauthorized copying and/or redistribution of video content 110 may involve watermarking video content 110. Watermarking video content 110 may generally involve introducing visual patterns or other effects to frames therein according to a defined scheme such that the visual patterns or other effects may subsequently be identified and analyzed in order to determine an origin of the video content 110 and/or other pertinent information. In some cases, watermarking may be performed such that each copy of video content 110 comprises a unique watermark that identifies characteristics of that particular copy, such as, for example, an identity of a purchaser and/or an identity of a client device authorized to play the video content 110. Watermarking of this type may be referred to as fingerprinting.

A factor for consideration in designing a watermarking scheme for use by a content distributor such as content distribution network 108 is the issue of watermark resilience. In some cases, an attacker may attempt to remove the watermark from a watermarked content item in order to be able to perform unauthorized copying and/or redistribution of the content item. For example, a user of client 102 may purchase video content 110, receive a watermarked copy thereof from content distribution network 108, and then attempt to remove the watermark in order to illegally copy and resell video content 110 to another user. Such an attacker may employ various techniques in order to attempt to remove or obscure the watermark. Examples of such techniques may include, without limitation, downsampling, downscaling, transcoding, compression, and residual zeroing. Generally speaking, such techniques may involve reducing the quality of the video content in order to remove the watermark or render the watermark unrecognizable. In order to discourage, reduce, and/or prevent unauthorized copying and/or distribution, it is desirable to watermark the video content in a resilient fashion, such that the watermark will survive slight modifications, and modifications significant enough to remove or obscure the watermark will degrade video quality to such an extent that the video content cannot be satisfactorily viewed.

Processing and communications overhead are additional factors for consideration in designing a watermarking scheme for use by a content distributor such as content distribution network 108. A particular content distributor may serve thousands or even millions of client devices. The distributor-side workload associated with watermarking the video content provided to such large numbers of users may be significant. This may be especially true in cases in which video content is fingerprinted, such that a unique watermark must be determined and applied each time a content item is distributed. Not only may distributor-side fingerprinting involve the performance of a significantly greater number of unique watermarking operations, but it also may result in increased network bandwidth consumption, because the unique nature of each content copy may preclude the application of technologies such as multicast/broadcast transmissions and/or caching proxies. Disclosed herein are watermarking techniques that may comprise improvements over conventional techniques in view of these considerations.

Figure 2:
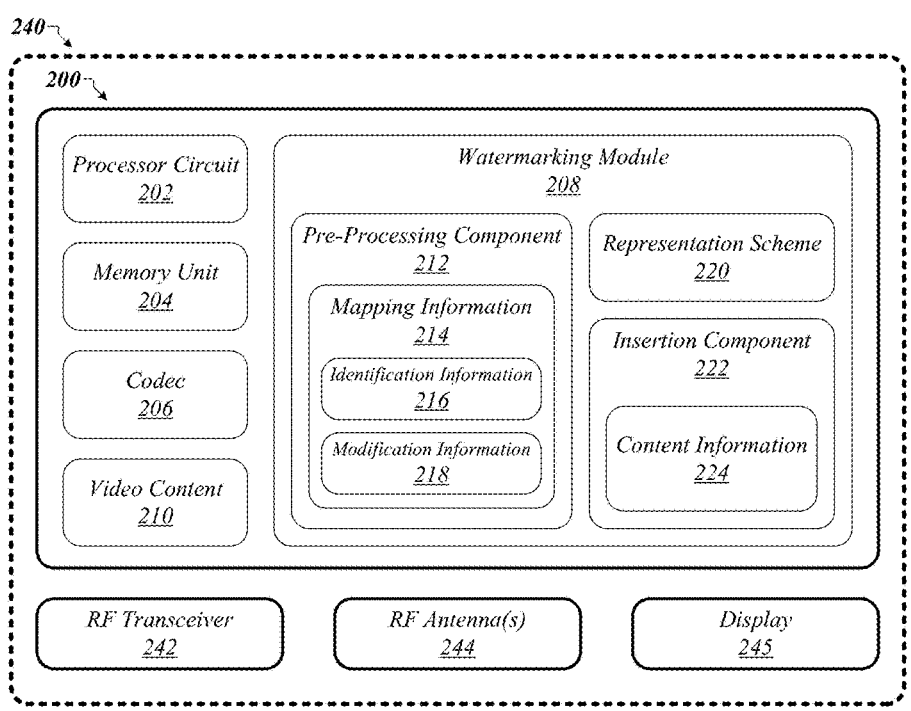
FIG. 2 illustrates one embodiment of a first apparatus and one embodiment of a first system.

FIG. 2 illustrates a block diagram of an apparatus 200 such as may be operative in various embodiments to implement improved techniques for watermarking of video content. In some embodiments, apparatus 200 may implement such improved techniques to produce a watermark that is more resilient to downsampling, downscaling, transcoding, compression, and/or residual zeroing attacks than those produced according to conventional techniques. As shown in FIG. 2, apparatus 200 comprises multiple elements including a processor circuit 202, a memory unit 204, an encoding/decoding module (CODEC) 206, and a watermarking module 208. The embodiments, however, are not limited to the type, number, or arrangement of elements shown in this figure.

In various embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In some embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

In various embodiments, apparatus 200 may comprise an encoding/decoding module ("codec") 206. Codec 206 may comprise logic, circuitry, and/or instructions operative to perform encoding and/or decoding of video content 210. In some embodiments, codec 206 may be operative to encode and/or decode video content 210 according to one or more video compression standards. In various embodiments, for example, codec 206 may be operative to encode and/or decode video content 210 according to International Telecommunication Union Telecommunication Standardization Sector (ITU-T) Recommendation ITU-T H.264, Edition 8, approved Apr. 13, 2013 ("the H.264 standard"), International Organization for Standardization/International Electrotechnical Commission (ISO/IEC) standard 14496-10: 2012-MPEG-4 Part 10, Advanced Video Coding (AVC) published Apr. 26, 2012 ("the AVC standard") and/or any predecessors, revisions, progeny and/or variants thereof. More particularly, in some embodiments, codec 206 may be operative to encode and/or decode video content 210 according to an H.264 standard and an MPEG-4 Part 10, AVC standard that are jointly maintained by the Joint Video Team (JVT) partnership between the ITU-T Video Coding Experts Group (VCEG) and the ISO/IEC JTC1 Moving Picture Experts Group (MPEG). Hereinafter, such jointly maintained standards shall be collectively referred to as H.264/AVC standards.

In various embodiments, apparatus 200 may comprise a watermarking module 208. Watermarking module 208 may comprise logic, circuitry, and/or instructions operative to perform watermarking of video content 210, as will be discussed in further detail below. In some embodiments, during the course of watermarking video content 210, watermarking module 208 may require encoding and/or decoding operations to be performed on video content 210. As such, in various embodiments, both codec 206 and watermarking module 208 may perform operations associated with the watermarking process. The embodiments are not limited in this context.

FIG. 2 also illustrates a block diagram of a system 240. System 240 may comprise any of the aforementioned elements of apparatus 200. System 240 may further comprise one or more additional components. For example, in some embodiments, system 240 may comprise a radio frequency (RF) transceiver 242. RF transceiver 242 may comprise one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 242 may operate in accordance with one or more applicable standards in any version. The embodiments are not limited in this context.

In various embodiments, transceiver 242 may be operative to perform wireless communications using one or more RF antennas 244. Examples of an RF antenna 244 may include an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. The embodiments are not limited in this context.

In some embodiments, system 240 may additionally or alternatively comprise a display 245. Display 245 may comprise any display device capable of displaying information received from processor circuit 202. Examples for display 245 may include a television, a monitor, a projector, and a computer screen. In one embodiment, for example, display 245 may be implemented by a liquid crystal display (LCD), light emitting diode (LED) or other type of suitable visual interface. Display 245 may comprise, for example, a touch-sensitive display screen ("touchscreen"). In various implementations, display 245 may comprise one or more thin-film transistors (TFT) LCD including embedded transistors. The embodiments are not limited in this context.

In general operation, apparatus 200 and/or system 240 may be operative to perform watermarking of video content such as video content 210. In various embodiments, apparatus 200 and/or system 240 may be operative to watermark various frames within video content 210, based on information associated with encoding and/or compression of the video content according to one or more video compression standards. For example, in various embodiments, video content 210 may comprise frames encoded and/or compressed according to an H.264/AVC standard, and apparatus 200 and/or system 240 may be operative to perform watermarking of video content 210 by modifying encoded and/or compressed frames therein. The embodiments are not limited in this context.

In some embodiments, such as those in which video content 210 comprises H.264/AVC content, apparatus 200 and/or system 240 may be operative to perform watermarking such that the watermark for video content 210 is embedded at least partially within B frames, and is extractable from those B frames. According to various conventional watermarking techniques, watermarks are embedded only within I and P frames, and are thus vulnerable to downsampling attacks that remove such frames from the video stream. Such downsampling attacks may be especially problematic when the video stream is compressed according to a particularly high-quality format, such as H.264/AVC High Profile. In such cases, the initial quality of the video stream may be high enough that the stream can be downsampled enough to consist of mostly B frames and still maintain an acceptable level of quality for viewing. By embedding watermarks within B frames, the improved techniques disclosed herein may produce watermarks that are less vulnerable to downsampling attacks than those generated using such conventional techniques.

In various embodiments, apparatus 200 and/or system 240 may be operative to watermark B frames of video content 210 such that the watermark is resistant to residual-zeroing attacks. According to some conventional watermarking techniques, watermarks are embedded in B frames simply by modifying QDCT coefficients for macroblocks within those B frames. Since the values of QDCT coefficients for B frame macroblocks typically follow a normal distribution with zero mean and very small variance, residual-zeroing attacks can be employed to remove such conventional watermarks with minimal and possibly even imperceptible video quality loss. According to the improved techniques disclosed herein, watermarks may be embedded within B frames by modifying motion vectors and residuals for macroblocks therein, yielding watermarks that are resistant to residual-zeroing attacks.

In some embodiments, apparatus 200 and/or system 240 may be operative to perform watermarking according to which error amplification effects are controlled and/or reduced. According to various video compression standards such as H.264/AVC, when a small distortion is introduced into a macroblock that is used to predict numerous other macroblocks, a substantial distortion of an entire frame may result. These distortions may be especially pronounced in B frames. In order to reduce or avoid such effects, apparatus 200 and/or system 240 may be operative to perform watermarking according to which macroblocks with smaller numbers of interdependencies are identified and used for watermarking. As such, apparatus 200 and/or system 240 may use B frames to produce watermarks that are more resilient to downscaling, residual-zeroing, and other types of attacks without introducing unacceptable distortions into the watermarked content. Other advantages may be associated with various embodiments, and the embodiments are not limited in this context.

In some embodiments, watermarking module 210 may comprise a pre-processing component 212. Pre-processing component 212 may comprise logic, circuitry, and/or instructions operative to determine, for each frame to be watermarked within video content 210, a set of macroblocks in that frame that are to be used for watermarking that frame. In various embodiments, pre-processing component 212 may be operative to generate mapping information 214. In some embodiments, for any given frame, mapping information 214 may comprise identification information 216 identifying the set of macroblocks determined for use in watermarking that frame. In various embodiments, mapping information 214 may also comprise, for the given frame, modification information 218 indicating how the set of macroblocks may or should be modified in conjunction with watermarking the frame.

In some such embodiments, modification information 218 may comprise information indicating how the various macroblocks identified by identification information 216 may be modified in order to represent and/or convey particular values according to a representation scheme 220. Representation scheme 220 may comprise rules and/or logic defining how bits, numbers, digits, characters, letters, and/or or other logical values are to be conveyed in watermarking frames of video content 210, and/or how the bits, numbers, digits, characters, letters, and/or or other logical values conveyed by various macroblocks are to be combined and/or collectively interpreted. For example, in various embodiments, representation scheme 220 may define a system according to which each macroblock identified for watermarking may be set to convey either a logical binary value '1' or a logical binary value '0', and may indicate an order in which binary values are to be read from the various macroblocks in order to generate a binary sequence. In some such embodiments, modification information 218 may comprise information indicating, for each of a set of macroblocks identified for watermarking, modifications to be performed in order to convey a binary '1' and/or modifications to be performed in order to convey a binary '0.' The embodiments are not limited in this context.

It is worthy of note that in various embodiments, the modifications indicated in mapping information 214 may comprise modifications to macroblocks in encoded and/or compressed versions of frames of video content 210, rather than modifications to raw image macroblocks of those frames. For example, in some embodiments, mapping information 214 may indicate modifications to be performed on macroblocks in predictively encoded and transformed frames of video content 210 encoded and/or compressed according to an H.264/AVC standard. As will be discussed in detail below, in various such embodiments, the indicated modifications may comprise modifications to motion vectors, residuals, and/or quantized discrete cosine transform (QDCT) coefficients for macroblocks in the predictively encoded and transformed frames. The embodiments are not limited in this context.

In some embodiments, once pre-processing component 212 has analyzed particular video content 210 and generated mapping information 214 for that video content 210, the mapping information 214 may be used in watermarking the video content 210. In various embodiments, for particular video content 210, apparatus 200 and/or system 240 may be operative to store the mapping information 214 and use it each time it watermarks that particular video content 210. As such, in some embodiments, pre-processing component 212 may only need to generate mapping information 214 once for any given video content 210. The embodiments are not limited in this context.

In various embodiments, watermarking module 208 may comprise an insertion component 222. Insertion component 222 may comprise logic, circuitry, and/or instructions operative to watermark video content 210 by performing modifications in accordance with mapping information 214. In some embodiments, the watermarking may comprise performing modifications that collectively convey content information 224 regarding the video content 210, when interpreted according to modification information 218 and representation scheme 220. For example, the watermarking may comprising modifying various macroblocks based on modification information 218 and representation scheme 220 to convey binary digits that collectively represent content information 224 for video content 210.

Content information 224 may comprise information indicating one or more characteristics of video content 210. Examples of content information 224 may include, without limitation, a title, identification number, or other identifier of video content 210, a version number of video content 210, and a name, identification number, or other identifier of a distributor of video content 210. In various embodiments, such as those in which a watermark applied to video content 210 comprises a fingerprint, content information 224 may comprise information that is specific to that fingerprinted copy of video content 210. Examples of such content information 224 may include, without limitation, an identification number of the copy, a name or identifier of a user authorized to view the copy and/or a device authorized to play back the copy, a time, date, and/or manner of acquisition of the copy, and information identifying a rights period during which the content may be consumed. The embodiments are not limited to these examples.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
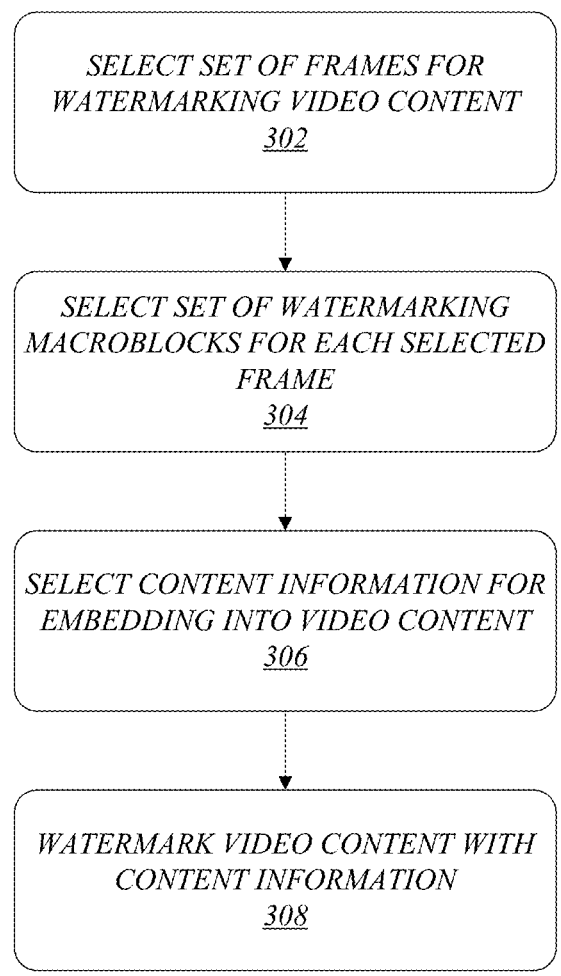
FIG. 3 illustrates one embodiment of a first logic flow.

FIG. 3 illustrates one embodiment of a logic flow 300, which may be representative of the operations executed by one or more embodiments described herein. More particularly, logic flow 300 illustrates an example of a process according to which apparatus 200 and/or system 240 of FIG. 2 may perform watermarking of video content 210. As shown in FIG. 3, a set of frames for watermarking video content may be selected at 302. For example, pre-processing component 212 of FIG. 2 may be operative to select a set of frames for watermarking video content 210. At 304, a set of watermarking macroblocks may be selected for each of the selected frames. For example, pre-processing component 212 of FIG. 2 to select a set of watermarking macroblocks for each frame of video content 210 that it selects at 302. At 306, content information may be selected for embedding into the video content. For example, processor circuit 202 of FIG. 2 may be operative to select content information 224 for embedding into video content 210. At 308, the video content may be watermarked with the content information. For example, insertion component 222 of FIG. 2 may be operative to watermark video content 210 by modifying one or more of the set of watermarking macroblocks for each of the selected frames in order to convey the selected content information 224, according to modification information 218 and representation scheme 220. The embodiments are not limited to these examples.

Figure 4:
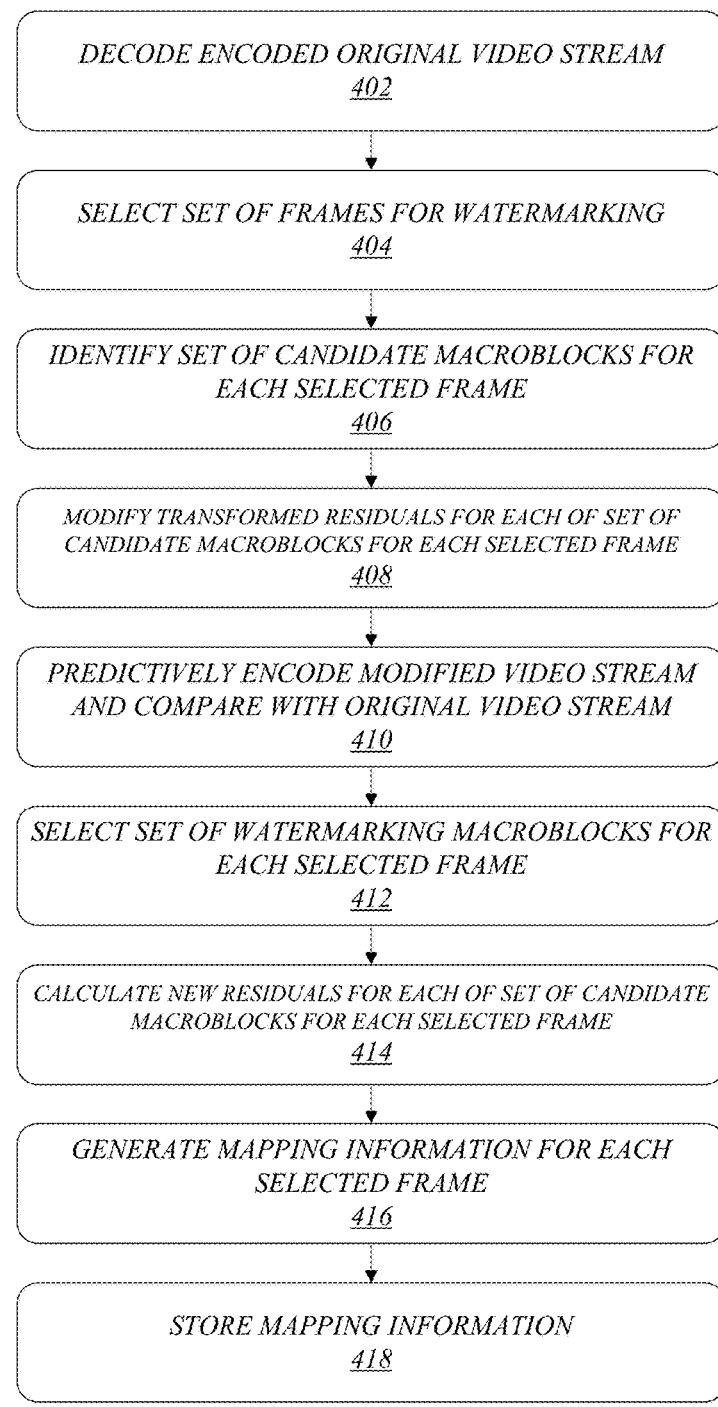
FIG. 4 illustrates one embodiment of a second logic flow.

FIG. 4 illustrates one embodiment of a logic flow 400, which may be representative of the operations executed by one or more embodiments described herein. More particularly, logic flow 400 illustrates an example of a process such as may correspond to operations 302 and 304 in logic flow 300 of FIG. 3. In some embodiments, according to such a process, pre-processing component 212 of FIG. 2 may be operative to select watermarking macroblocks to be used for watermarking frames of video content 210, and to generate mapping information 214 comprising identification information 216 identifying the selected watermarking macroblocks and modification information 218 indicating how the selected watermarking macroblocks may be modified in order to convey particular information or values.

As shown in FIG. 4, an encoded original video stream comprising a plurality of frames may be decoded at 402. For example, codec 206 of FIG. 2 may be operative to decode an encoded original video stream comprising video content 210. In various embodiments, the encoded original video stream may comprise an H.264/AVC video stream. In some embodiments, the decoding may comprise unpacking network abstraction layer (NAL) units of the encoded original video stream, performing entropy decoding of the encoded original video stream, and extracting prediction mode information, motion vectors, and residuals for macroblocks comprised among the plurality of frames.

At 404, a set of frames may be selected, from among the plurality of frames, for use in watermarking. For example, pre-processing component 212 of FIG. 2 may be operative to select a set of frames from among a plurality of frames of video content 210 for use in watermarking. In various embodiments, the set of selected frames may comprise frames containing inter-predicted macroblocks. In some embodiments, the one or more selected frames may exclusively comprise B frames, while in various other embodiments, they may also include P frames.

At 406, in each of the selected frames, a set of candidate macroblocks may be identified. For example, pre-processing component 212 of FIG. 2 may be operative to identify a set of candidate macroblocks for each selected frame of video content 210. In some embodiments, the candidate macroblocks may comprise inter-predicted macroblocks.

In various such embodiments, the candidate macroblocks may comprise leaf inter-predicted macroblocks that are not used for inter-prediction of other macroblocks and for which the transformed residuals comprise at least a particular number of non-zero QDCT coefficients. For example, in some embodiments, the candidate macroblocks may comprise macroblocks for which the transformed residuals comprise four or more non-zero QDCT coefficients.

At 408, for each of the selected frames of the original video stream, the transformed residuals for each of the set of candidate macroblocks may be modified to obtain a modified video stream. For example, pre-processing component 212 of FIG. 2 may be operative to modify transformed residuals for each of the set of candidate macroblocks for each selected frame of video content 210. In various embodiments, modifying the transformed residuals for the candidate macroblocks may comprise modifying particular QDCT coefficients of the transformed residuals. In some embodiments, for example, modifying the transformed residuals for the candidate macroblocks may comprise modifying three low-frequency QDCT coefficients within the transformed residuals. In an example embodiment, with respect to transformed residuals comprising QDCT coefficient arrays in which element (0,0) comprises the zero-frequency QDCT coefficient, modifying the transformed residuals may comprise modifying the low-frequency QDCT coefficients residing at elements (0,1), (1,1), and (1,0) within the QDCT coefficient arrays. In various embodiments, the margin by which the QDCT coefficients are modified may comprise a design parameter, and may be selected based on a tradeoff between video quality and watermark resilience.

At 410, the modified video stream may be predictively encoded and compared with the original video stream. For example, codec 206 may be operative to predictively encode the modified video stream and pre-processing component may be operative to compare it with the original video stream. In some embodiments, it may be determined, for each of the one or more selected frames, which of the candidate macroblocks are still inter-predictively encoded in the modified video stream.

At 412, for each of the selected frames, a set of watermarking macroblocks may be selected from among the candidate macroblocks that are inter-predictively encoded in the modified video stream. For example, pre-processing component 212 of FIG. 2 may be operative to select a set of watermarking macroblocks from among the candidate macroblocks that are still inter-predictively encoded in the modified video stream. In various embodiments, the set of watermarking macroblocks may comprise candidate macroblocks that are inter-predictively encoded in the modified video stream and for which the transformed residuals in the modified video stream comprise at least one low-frequency QDCT coefficient equal to zero. In some embodiments, for purposes of this determination, the same elements may be consulted in QDCT coefficient arrays of the modified video stream as were consulted in the QDCT coefficient arrays of the original video stream. For example, in embodiments in which the (0,1), (1,1), and (1,0) elements of the QDCT coefficient arrays of the original video stream are modified at 408, the (0,1), (1,1), and (1,0) elements of the QDCT coefficients of the modified video stream may be consulted, and macroblocks for which at least one of these elements is equal to zero may be selected as watermarking macroblocks at 412.

At 414, for each of the selected watermarking macroblocks in each of the one or more selected frames, new residuals may be calculated order to restore the values of non-zero transform coefficients corresponding to previously modified transform coefficients. For example, pre-processing component 212 of FIG. 2 may be operative to calculate new residuals in order to restore the values of such non-zero transform coefficients. In an example embodiment in which the (0,1), (1,1), and (1,0) elements of the QDCT coefficient arrays of the original video stream are modified at 408, new residuals may be calculated at 414 in order to restore the values of non-zero QDCT coefficients comprised in elements (0,1), (1,1) and (1,0) in residuals of the modified stream.

At 416, mapping information may be generated for each of the selected frames. For example, pre-processing component 212 of FIG. 2 may be operative to generate mapping information 214 for each of the selected frames. In various embodiments, the mapping information may comprise identification information. In some embodiments, for each of the one or more selected frames, the mapping information may comprise identification information identifying one or more selected watermarking macroblocks within that frame. In various embodiments, the mapping information may comprise modification information. In some embodiments, for each selected watermarking macroblock in each selected frame, the modification information may indicate how that selected watermarking macroblock may be modified in order to convey one or more bits, numbers, digits, characters, letters, and/or or other logical values.

In various embodiments, for example, for any particular watermarking macroblock, the modification information may comprise a new motion vector obtained via the predictive encoding at 410 and a new residual calculated at 414, and may indicate that the new motion vector and the new residual may either be used or not used in order to convey particular values. More particularly, in some embodiments, the modification information may indicate that the original motion vector and original residual for the watermarking macroblock should be replaced by the new motion vector and the new residual in order to set the watermarking macroblock to convey a logical bit '1,' and that the original motion vector and residual should be maintained in order to set the watermarking macroblock to convey a logical bit '0.'

At 418, the mapping information generated at 416 may be stored for subsequent use in watermarking the video content. For example, pre-processing component 212 of FIG. 2 may be operative to store mapping information 214 for video content 210 in memory unit 204. It is to be understood that in various embodiments, the mapping information may additionally or alternatively be immediately used to watermark the video content. The embodiments are not limited in this context.

Figure 5:
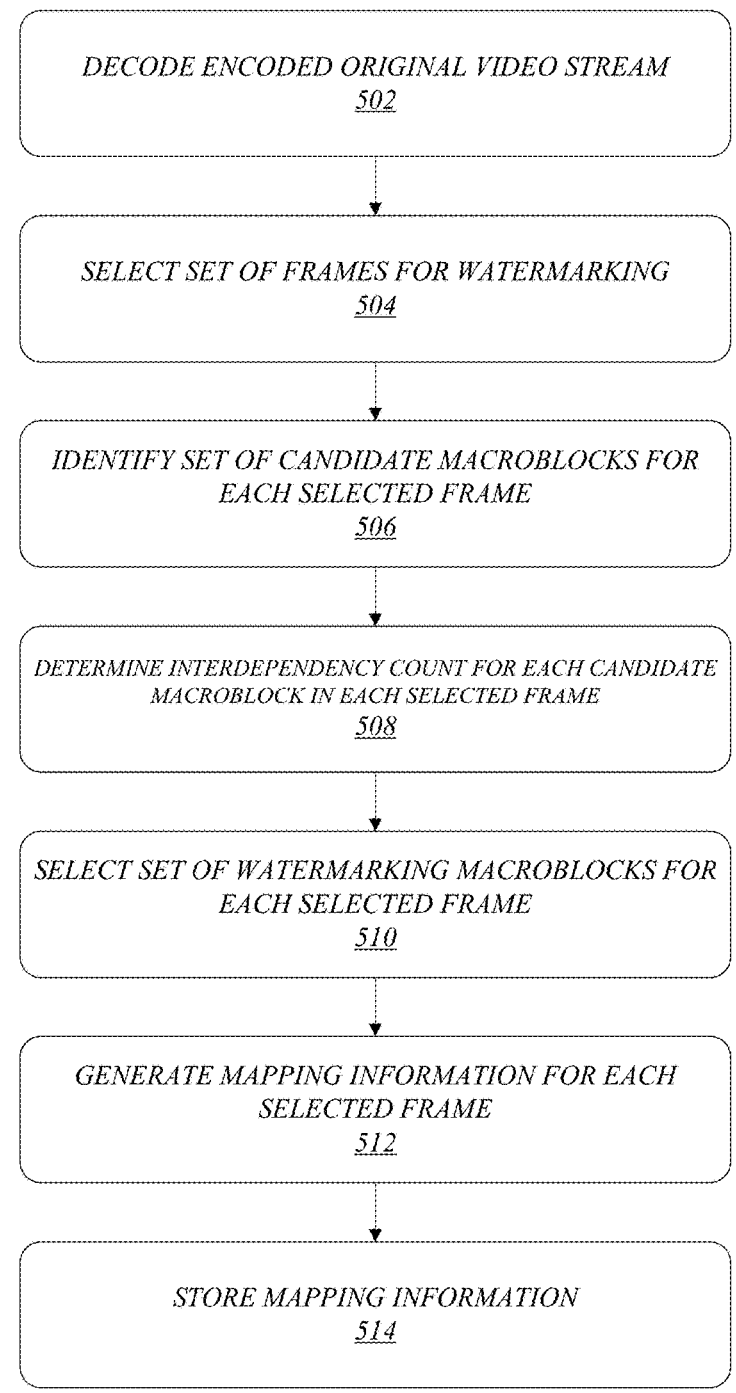
FIG. 5 illustrates one embodiment of a third logic flow.

FIG. 5 illustrates one embodiment of a logic flow 500, which may be representative of the operations executed by one or more embodiments described herein. More particularly, logic flow 500 illustrates an example of another process such as may correspond to operations 302 and 304 in logic flow 300 of FIG. 3. In some embodiments, according to such a process, pre-processing component 212 of FIG. 2 may be operative to select watermarking macroblocks to be used for watermarking frames of video content 210, and to generate mapping information 214 comprising identification information 216 identifying the selected watermarking macroblocks and modification information 218 indicating how the selected watermarking macroblocks may be modified in order to convey particular information or values. In various embodiments, the process embodied in logic flow 500 may be complementary to that of logic flow 400 of FIG. 4, such that pre-processing component 212 of FIG. 2 performs both processes in order to select watermarking macroblocks for video content 210. In other embodiments, the process embodied in logic flow 500 may comprise an alternative to that of logic flow 400 of FIG. 4, and pre-processing component 212 of FIG. 2 may perform only one of the two processes. The embodiments are not limited in this context.

As shown in FIG. 5, an encoded original video stream comprising a plurality of frames may be decoded at 502. For example, codec 206 of FIG. 2 may be operative to decode an encoded original video stream comprising video content 210. In some embodiments, the encoded original video stream may comprise an H.264/AVC video stream. In various embodiments, the decoding may comprise unpacking network abstraction layer (NAL) units of the encoded original video stream, performing entropy decoding of the encoded original video stream, and extracting prediction mode information, motion vectors, and residuals for macroblocks comprised among the plurality of frames.

At 504, a set of frames may be selected, from among the plurality of frames, for use in watermarking. For example, pre-processing component 212 of FIG. 2 may be operative to select a set of frames from among a plurality of frames of video content 210 for use in watermarking. In some embodiments, the set of selected frames may comprise I frames and P frames.

At 506, in each of the selected frames, a set of candidate macroblocks may be identified. For example, pre-processing component 212 of FIG. 2 may be operative to identify a set of candidate macroblocks for each selected frame of video content 210. In various embodiments, the candidate macroblocks may comprise macroblocks for which the transformed residuals comprise at least a particular number of non-zero QDCT coefficients. For example, in some embodiments, the candidate macroblocks may comprise macroblocks for which the transformed residuals comprise four or more non-zero QDCT coefficients.

At 508, for each candidate macroblock in each selected frame, an interdependency count may be determined. For example, pre-processing component 212 of FIG. 2 may be operative to determine an interdependency count for each candidate macroblock in each selected frame. For any particular candidate macroblock, the interdependency count may indicate a number of other macroblocks that are predicted based on that candidate macroblock. In various embodiments, multiple frames may contain macroblocks that are predicted based on the candidate macroblock, and the interdependency count may indicate a total number of such macroblocks across the multiple frames.

At 510, for each of the selected frames, a set of watermarking macroblocks may be selected from among the candidate macroblocks. For example, pre-processing component 212 of FIG. 2 may be operative to select a set of watermarking macroblocks from among the candidate macroblocks for each selected frame. In some embodiments, the watermarking macroblocks may be selected based on the interdependency counts of the candidate macroblocks. In various embodiments, for example, candidate macroblocks having associated interdependency counts that are less than a threshold value may be selected as watermarking macroblocks. In an example embodiment, candidate macroblocks having associated interdependency counts that are less than 4 may be selected as watermarking macroblocks.

At 512, mapping information may be generated for each of the selected frames. For example, pre-processing component 212 of FIG. 2 may be operative to generate mapping information 214 for each of the selected frames. In some embodiments, the mapping information may comprise identification information. In various embodiments, for each of the one or more selected frames, the mapping information may comprise identification information identifying one or more selected watermarking macroblocks within that frame. In some embodiments, the mapping information may comprise modification information. In various embodiments, for each selected watermarking macroblock in each selected frame, the modification information may indicate how that selected watermarking macroblock may be modified in order to convey one or more bits, numbers, digits, characters, letters, and/or or other logical values.

In some embodiments, for example, for each selected watermarking macroblock, the modification information may identify a low-frequency QDCT coefficient of that macroblock that may be modified during watermarking in order to convey one or more bits, numbers, digits, characters, letters, and/or or other logical values. In various embodiments, the low-frequency QDCT coefficient may be randomly selected during generation of the modification information. In some embodiments, for example, the low-frequency QDCT coefficient may be randomly selected from among elements (0,1), (1,1), and (1,0) in a QDCT coefficient array for the watermarking macroblock. In various embodiments, selection of the watermarking macroblocks and generation of the modification information may be performed in conjunction with a representation scheme that defines how the low-frequency QDCT coefficients are to be modified during watermarking in order to convey particular information. In some embodiments, for example, the representation scheme may define a margin by which the low-frequency QDCT coefficients should be increased in order to convey a logical bit '1' and by which they should be decreased in order to convey a logical bit '0.' In various embodiments, this margin may comprise a design parameter selected based on a tradeoff between video quality and watermark resilience.

At 514, the mapping information generated at 512 may be stored for subsequent use in watermarking the video content. For example, pre-processing component 212 of FIG. 2 may be operative to store mapping information 214 for video content 210 in memory unit 204. It is to be understood that in some embodiments, the mapping information may additionally or alternatively be immediately used to watermark the video content. As noted above, in various embodiments, the process embodied in logic flow 500 may be complementary to that of logic flow 400 of FIG. 4, such that pre-processing component 212 of FIG. 2 performs both processes in order to select watermarking macroblocks for video content 210. As such, in some embodiments, the mapping information generated at 512 may be combined with mapping information generated at 418 in FIG. 4, and the combined mapping information may be stored for subsequent use in watermarking the video content, and/or immediately used to watermark the video content. The embodiments are not limited in this context.

Returning to FIG. 3, in various embodiments, operation 302 may only need to be completed once for any particular video content item. In some such embodiments, such as those in which each watermark comprises a unique fingerprint, the selection at 304 of the content information to be embedded and the embedding of that content information at 306 may be performed on each copy of the video content item at the time of distribution and/or consumption. In various other embodiments, all three operations may be performed only once, to generate a master watermarked copy of the video content, and that same master watermarked copy may be used each time the content is distributed and/or consumed. The embodiments are not limited in this context.

In some embodiments, operations 302, 304, and 306 may all be performed on the distributor side. For example, with respect to operating environment 100 of FIG. 1, content distribution network 108 may comprise an apparatus such as apparatus 200 of FIG. 2 that is operative to select watermarking macroblocks in video content 110 using logic flow 400 of FIG. 4 and/or logic flow 500 of FIG. 5, and then when it distributes a copy of the video content 110, is operative to select content information for embedding and watermark the copy with the content information. However, in view of considerations such as network overhead, in various embodiments there may be advantages associated with arrangements in which watermarking is performed on the client-side.

Figure 6:
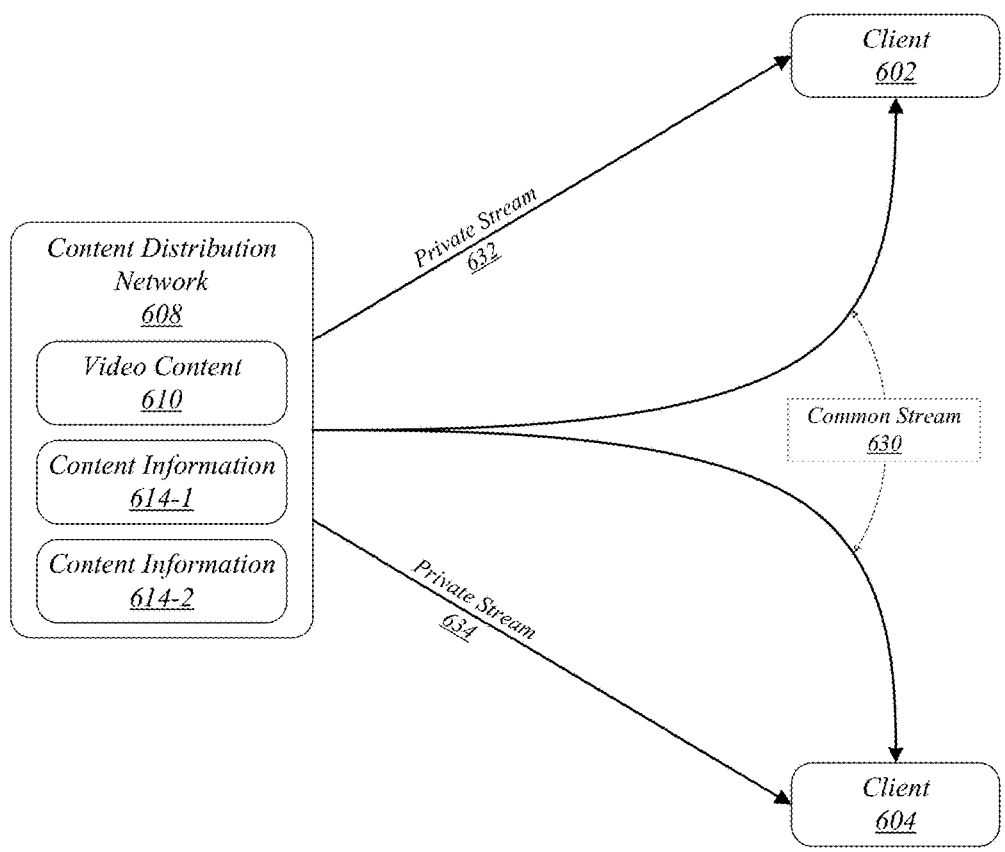
FIG. 6 illustrates one embodiment of a second operating environment.

FIG. 6 illustrates an embodiment of an operating environment 600 such as may be associated with some embodiments in which watermarking is performed on the client side. As shown in FIG. 6, in operating environment 600, clients 602 and 604 both communicate with content distribution network 608 in order to access video content 610. The content distribution network 608 is capable of sending a common stream 630 to clients 602 and 604 simultaneously. In various embodiments, common stream 630 may comprise a multicast or broadcast stream. Content distribution network 608 is also capable of sending a private stream 632 to client 602 and a private stream 634 to client 604. In some embodiments, private streams 632 and 634 may comprise unicast streams, or other types of single-recipient streams.

In order to enable fingerprinting of the respective copies of video content 610 that it distributes to clients 602 and 604, content distribution network 608 generates content information 614-1 for embedding into a copy consumed at client 602, and generates content information 614-2 for embedding into a copy consumed at client 604. It may be possible for content distribution network 608 to perform distributor-side watermarking using content information 614-1 and 614-2 to generate respective fingerprinted copies of video content 610 for clients 602 and 604. However, since the fingerprinted copies would differ from each other, content distribution network 608 would not be able to send them to clients 602 and 604 via common stream 630, and instead would need to send them via respective private streams 632 and 634. This may consume significantly more network resources and/or bandwidth, may significantly increase network hardware and/or software overhead, may preclude the use of caching proxies, and/or may significantly increase a processing workload of the content distribution network 608. In order to reduce or avoid such effects, content distribution network 608 may implement an arrangement according to which pre-processing is performed on the distributor side but watermarking is performed on the client side.

Figure 7:
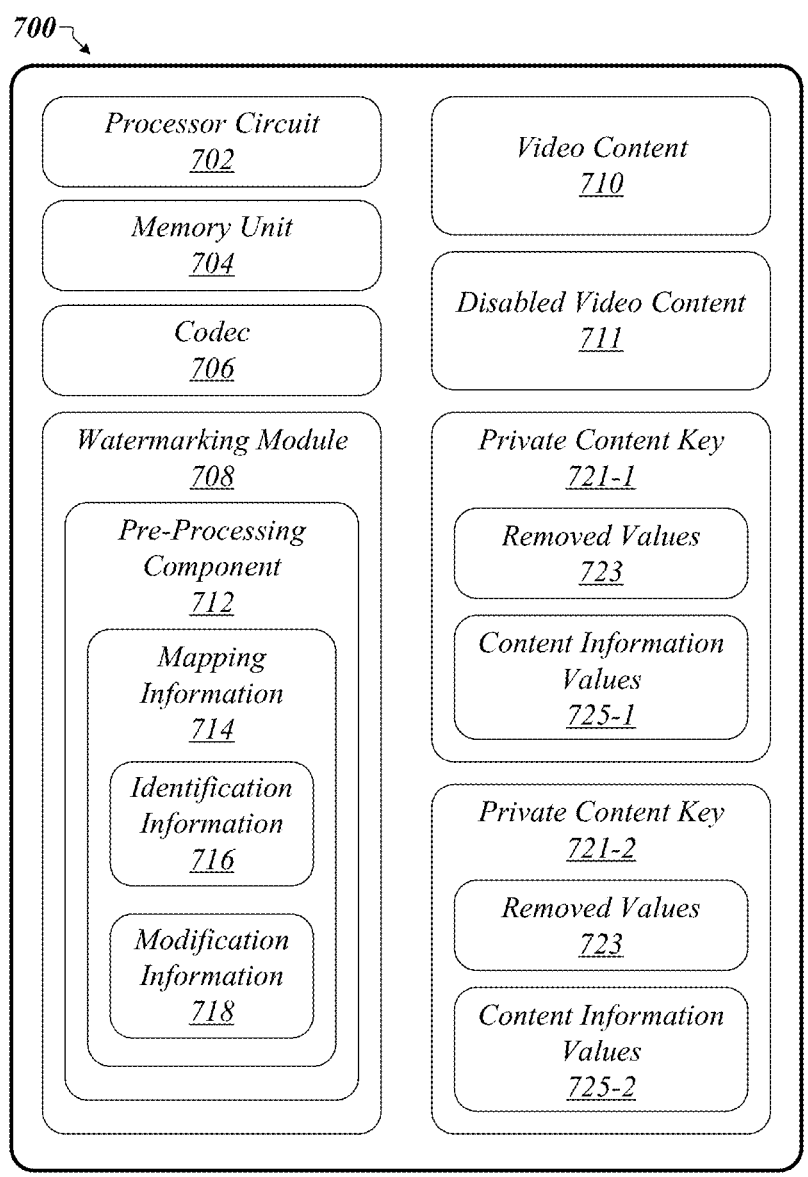
FIG. 7 illustrates one embodiment of a second apparatus.

FIG. 7 illustrates a block diagram of an apparatus 700 such as may be used by content distribution network 608 of FIG. 6 to implement client-side watermarking. In various embodiments, apparatus 700 may comprise a processor circuit 702. Processor circuit 702 may be implemented using any processor or logic device, and may be the same as or similar to processor circuit 202 of FIG. 2. In some embodiments, apparatus 700 may comprise a memory unit 704. Memory unit 704 may be implemented using any machine-readable or computer-readable media capable of storing data, including both volatile and non-volatile memory, and may be the same as or similar to memory unit 204 of FIG. 2. In various embodiments, apparatus 700 may comprise a codec 706. Codec 706 may comprise logic, circuitry, and/or instructions operative to perform encoding and/or decoding of video content 710, and may be the same as or similar to codec 206 of FIG. 2. It is to be understood that although not depicted in FIG. 7, a system may comprise apparatus 700 and one or more additional components. For example, in some embodiments, apparatus 700 may be comprised within a system that also comprises a display, a radio frequency (RF) transceiver, and/or one or more RF antennas. The embodiments are not limited in this context.

In various embodiments, apparatus 700 may comprise a watermarking module 708 that includes a pre-processing component 712. In some embodiments, pre-processing component 712 may be operative to select sets of watermarking macroblocks for various frames of video content 710, and to generate mapping information 714 comprising identification information 716 identifying the selected watermarking macroblocks and modification information 718 indicating how the selected watermarking macroblocks may be modified in order to convey particular information or values. For example, in various embodiments, pre-processing component 712 may be operative to perform the operations of logic flow 400 of FIG. 4 and/or the operations of logic flow 500 of FIG. 5 in order to select watermarking macroblocks and generate associated mapping information 714 comprising identification information 716 and modification information 718. The embodiments are not limited in this context.

In some embodiments, pre-processing component 712 may be operative to generate disabled video content 711 based on video content 710 and identification information 716. Disabled video content 711 may comprise an altered version of video content 710 comprising modifications that render it unusable and/or unsuitable for consumption as a solitary stream. In various embodiments, pre-processing component 712 may be operative to generate disabled video content 711 by identifying watermarking macroblocks for various frames of video content 710 based on identification information 716, and removing values of residuals, transform coefficients, motion vectors, and/or raw image data associated with the watermarking macroblocks and replacing them with zeros or null values. In some embodiments, this process may render disabled video content 711 unusable and/or unsuitable for consumption as a solitary stream because the absence of the replaced values may result in severe artifact effects if solitary playback of the disabled video content 711 is attempted. In various embodiments, pre-processing component 712 may only need to generate disabled video content 711 once, and may be operative to store disabled video content 711 along with removed values 723 comprising the values of residuals, transform coefficients, motion vectors, and/or raw image data that were replaced with zeroes or null values in order to generate disabled video content 711. The embodiments are not limited in this context.

In some embodiments, watermarking module 708 may be operative to generate one or more private content keys 721 for use by one or more respective clients to construct usable copies of video content 710 based on disabled video content 711. For example, with respect to operating environment 600 of FIG. 6, pre-processing component 712 may be operative to generate a private content key 721-1 for use by client 602 and may be operative to generate a private content key 721-2 for use by client 604. In various embodiments, each private content key 721 may comprise the same removed values 723 but may comprise unique content information values 725. In some embodiments, the content information values 725 may comprise values indicating macroblock modifications that collectively convey content information when interpreted according to modification information 718 and a representation scheme. With respect to operating environment 600 of FIG. 6, private content key 721-1 of FIG. 7 may contain removed values 723 and content information values 725-1 usable for generating a fingerprint associated with client 602, and private content key 721-2 may comprise removed values 723 and content information values 725-2 usable for generating a fingerprint associated with client 604. The embodiments are not limited in this context.

In various embodiments, watermarking module 708 may be operative to generate private content keys 721 in such a fashion that on the client side, the removed values 723 are not distinguishable from the content information values 725. In some such embodiments, when generating any particular private content key 721, watermarking module 708 may be operative to combine removed values 723 with content information values 725 to obtain a combined set of values and/or modifications for application to disabled video content 711. For example, in various embodiments, watermarking module may be operative to generate a private content key 721 by substituting content information values 725 for particular values among removed values 723. A client receiving such a private content key 721 may have no way of determining which values in the key comprise content information values 725 and which comprise removed values 723, and thus may be forced to apply the fingerprint embodied by the content information values 725 in order to unlock the disabled video content 711.

In an example embodiment, apparatus 700 may employ a representation scheme according to which the original motion vectors and original residuals for watermarking macroblocks are replaced by new motion vectors and/or new residuals in order to convey a logical bit '1,' and are maintained in order to convey a logical bit '0.' Removed values 723 may comprise the original motion vectors and original residuals for the watermarking macroblocks of video content 710, and content information values 725 may indicate which watermarking macroblocks are to convey a '1' and may comprise new motion vectors and/or new residuals for those macroblocks. Watermarking module 708 may generate a private content key 721 by substituting the new motion vectors and/or new residuals in content information values 725 for the original motion vectors and/or original residuals in removed values 723 that correspond to the same watermarking macroblocks. A client that receives the private content key 721 may have no way of determining which values comprise new motion vectors and/or new residuals, and which comprise original motion vectors and/or original residuals. As such, the client may have no way of isolating the watermarking information of the private content key 721, and may be forced to apply a fingerprint embodied by the content information values 725 in order to unlock disabled video content 711. The embodiments are not limited to this example.

It is worthy of note that the terms "key" and "unlock" as employed herein, such as with respect to private content keys 721 and disabled video content 711, are not intended to specifically connote the use of cryptographic techniques. Rather, the terms "key" and "unlock" are employed in a broader sense, to generally connote that particular information may enable access to and/or use of other information or features. Thus, for example, private content keys 721 are referred to as "keys" simply because they enable consumption of video content 710 when used to "unlock" disabled video content 711. However, this does not preclude the application of cryptographic techniques in various embodiments. For example, in some embodiments, values within video content 710 may be zeroed and the modified content may then be encrypted to generate disabled video content 711, and a private content key 721 for the disabled video content 711 may include not only removed values 723 but also a cryptographic key usable to decrypt the disabled video content 711. The embodiments are not limited in this context.

In various embodiments, because each consumer of video content 710 constructs its copy of video content 710 using the same disabled video content 711, a common stream may be used to concurrently send disabled video content 711 to multiple consumers of video content 710. In some embodiments, private streams may be used to send private content keys 721 to the respective consumers. For example, with respect to operating environment 600 of FIG. 6, if clients 602 and 604 both request access to video content 610 for consumption, apparatus 700 of FIG. 7 may be operative to send a disabled version of the video content 610 to clients 602 and 604 via common stream 630, may be operative to generate private content keys for clients 602 and 604 based on respective content information 614-1 and 614-2, and may be operative to send the private content keys to clients 602 and 604 via respective private streams 632 and 634. Clients 602 and 604 may apply the modifications indicated by their respective private content keys in order to unlock the disabled version of the video content 610, and by applying those modifications, may also fingerprint their respective copies of video content 610. The embodiments are not limited to this example.

In various embodiments, the private content keys 721 may be substantially smaller than the disabled video content 711. For example, in some embodiments, the private content keys 721 may be tens or hundreds of times smaller than the disabled video content 711. One advantage associated with various embodiments may be that the network overhead associated with private stream communications may be reduced, due to the use of a common stream to carry the bulk of the content data. Another advantage associated with some embodiments may be that processing overhead of the content distribution network may be reduced, because the actual watermarking is performed by the client devices rather than the content distribution network. Other advantages may be associated with various embodiments, and the embodiments are not limited in this context.

It is worthy of note that in some embodiments, it may be possible for systems that do not employ fingerprinting to realize processing overhead reductions by implementing client-side watermarking. As such, in various embodiments, private content keys 721 may convey non-unique watermarks rather than fingerprints. The embodiments are not limited in this context.

Figure 8:
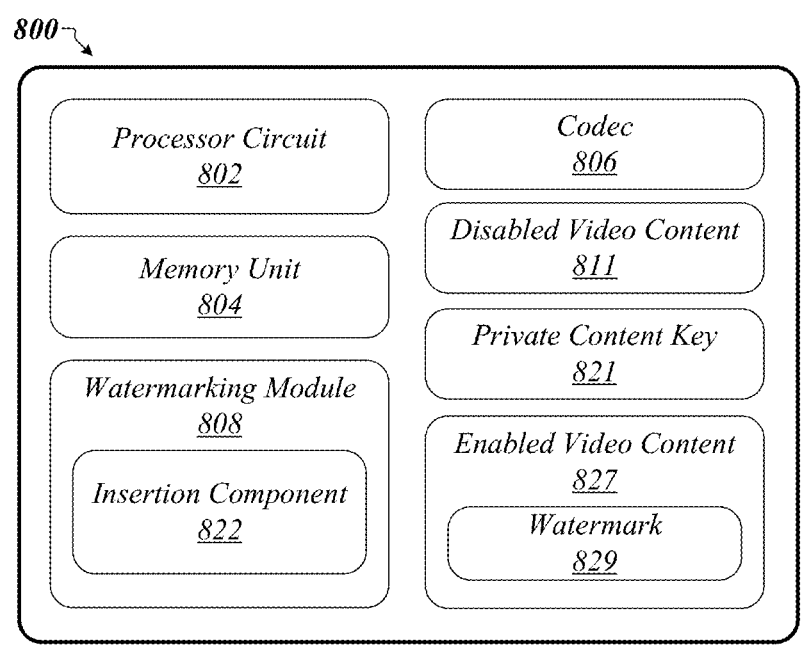
FIG. 8 illustrates one embodiment of a third apparatus.

FIG. 8 illustrates a block diagram of an apparatus 800 that comprises an example of a device that may perform client-side watermarking according to some embodiments. In various embodiments, apparatus 800 may comprise a processor circuit 802. Processor circuit 802 may be implemented using any processor or logic device, and may be the same as or similar to processor circuit 202 of FIG. 2 and/or processor circuit 702 of FIG. 7. In some embodiments, apparatus 800 may comprise a memory unit 804. Memory unit 804 may be implemented using any machine-readable or computer-readable media capable of storing data, including both volatile and non-volatile memory, and may be the same as or similar to memory unit 204 of FIG. 2 and/or memory unit 704 of FIG. 7. In various embodiments, apparatus 800 may comprise a codec 806. Codec 806 may comprise logic, circuitry, and/or instructions operative to perform encoding and/or decoding of video content, and may be the same as or similar to codec 206 of FIG. 2 and/or codec 706 of FIG. 7. It is to be understood that although not depicted in FIG. 8, a system may comprise apparatus 800 and one or more additional components. For example, in some embodiments, apparatus 800 may be comprised within a system that also comprises a display, a radio frequency (RF) transceiver, and/or one or more RF antennas. The embodiments are not limited in this context.

As shown in FIG. 8, apparatus 800 may comprise a watermarking module 808 that includes an insertion component 822. Insertion component 822 may comprise logic, circuitry, and/or instructions operative to construct enabled video content 827 based on disabled video content 811 and a private content key 821. In various embodiments, apparatus 800 may be operative to receive disabled video content 811 via a common stream from a content distribution network, such as the content stream 630 sent by content distribution network 608 of FIG. 6. In some embodiments, apparatus 800 may be operative to receive private content key 821 via a private stream from a content distribution network, such as the private stream 632 sent from content distribution network 608 to client 602 in FIG. 6. The embodiments are not limited in this context.

In various embodiments, disabled video content 811 may comprise an altered version of particular video content, comprising modifications that render it unusable and/or unsuitable for consumption as a solitary stream. For example, in some embodiments, disabled video content 811 may comprise video content in which values of residuals, transform coefficients, motion vectors, and/or raw image data associated with various macroblocks have been replaced with zeros or null values. In various embodiments, private content key 821 may comprise information indicating a set of modifications to be applied to disabled video content 811 in order to render it suitable for consumption. In some embodiments, the set of modifications may comprise modifications to macroblocks in one or more frames of disabled video content 811. In various embodiments, the modifications may comprise replacing zeroed or nulled values of residuals, transform coefficients, motion vectors, and/or raw image data for the macroblocks. The embodiments are not limited in this context.

In some embodiments, apparatus 800 may be operative to send a request to view particular video content, and may receive disabled video content 811 and private content key 821 in response to the request. In various embodiments, insertion component 822 may be operative to unlock disabled video content 811 using private content key 821. More particularly, insertion component 822 may be operative to modify disabled video content 811 by inserting values indicated by private content key 821 for residuals, transform coefficients, motion vectors, and/or raw image data of zeroed or nulled macroblocks in one or more frames of disabled video content 811. The embodiments are not limited in this context.

In some embodiments, private content key 821 may comprise information indicating modifications that, when performed by insertion component 822, are operative not only to unlock disabled video content 811 but also to insert a watermark therein. In various embodiments, by unlocking and watermarking disabled video content 811, insertion component 822 may be operative to construct enabled video content 827. Enabled video content 827 may comprise video content that is suitable for consumption and that contains a watermark 829 defined by the information in private content key 821. In some embodiments, the watermark 829 may comprise a fingerprint or other type of unique watermark. The embodiments are not limited in this context.

In various embodiments, although private content key 821 may indicate modifications that serve the dual purposes of unlocking and watermarking disabled video content 811, the modifications may be indicated in such a fashion that it may not be possible for apparatus 800 to determine what watermarking information, if any, is conveyed by a particular modification. For example, with respect to the previously discussed representation scheme according to which original motion vectors and/or original residuals are used to indicate logical '0's and new motion vectors and/or new residuals are used to indicate logical '1's, apparatus 800 may have no way of determining which values in private content key 821 correspond to original motion vectors and/or residuals and which values correspond to new motion vectors and/or residuals. As such, apparatus 800 may have no way of isolating the watermarking information of private content key 821, and may be forced to apply a watermark 829 contained defined by the private content key 821 in order to unlock disabled video content 811.

Figure 9:
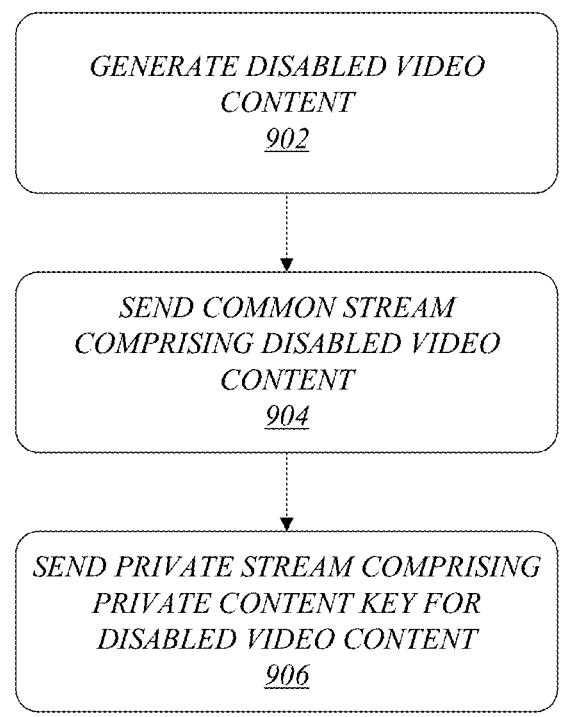
FIG. 9 illustrates one embodiment of a fourth logic flow.

FIG. 9 illustrates one embodiment of a logic flow 900, which may be representative of the operations executed by one or more embodiments described herein. More particularly, logic flow 900 illustrates an example of a process according to which apparatus 700 of FIG. 7 may distribute video content in conjunction with a client-side watermarking scheme in some embodiments. As shown in FIG. 9, at 902, disabled video content may be generated. For example, pre-processing component 712 of FIG. 7 may be operative to generated disabled video content 711. In various embodiments, the disabled video content may be generated by modifying watermarking macroblocks in one or more frames of video content. For example, in some embodiments, pre-processing component 712 of FIG. 7 may be operative to generate disabled video content 711 by modifying watermarking macroblocks in frames of video content 710.

At 904, a common stream may be sent that comprises the disabled video content. For example, apparatus 700 of FIG. 7 may be operative to send a common stream comprising disabled video content 711. In various embodiments, the common stream may comprise a multicast stream or a broadcast stream. At 906, a private stream may be sent that comprises a private content key for the disabled video content. For example, apparatus 700 of FIG. 7 may be operative to send a private stream comprising a private content key 721 for disabled video content 711. In some embodiments, the private content key may define a watermark for the video content. For example, in various embodiments, a private content key 721 sent by apparatus 700 of FIG. 7 may define a watermark for video content 710. The embodiments are not limited to these examples.

Figure 10:
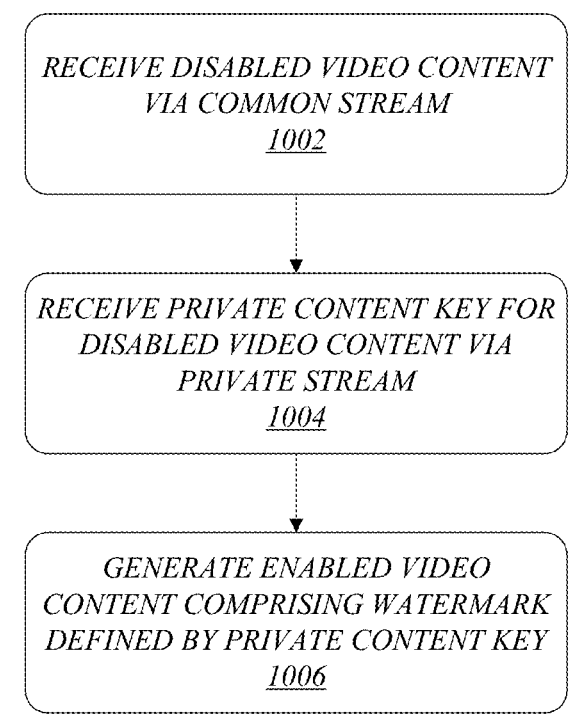
FIG. 10 illustrates one embodiment of a fifth logic flow.

FIG. 10 illustrates one embodiment of a logic flow 1000, which may be representative of the operations executed by one or more embodiments described herein. More particularly, logic flow 1000 illustrates an example of a process according to which apparatus 800 of FIG. 8 may perform watermarking in conjunction with consumption of video content according to a client-side watermarking scheme in some embodiments. As shown in FIG. 10, at 1002, disabled video content may be received via a common stream. For example, apparatus 800 of FIG. 8 may be operative to receive disabled video content 811 via a common stream. In various embodiments, the common stream may comprise a multicast stream or a broadcast stream.

At 1004, a private content key for the disabled video content may be received via a private stream. For example, apparatus 800 of FIG. 8 may be operative to receive a private content key 821 for the disabled video content 811 via a private stream. At 1006, enabled video content may be generated based on the disabled video content and the private content key, and the enabled video content may comprise a watermark defined by the private content key. For example, watermarking module 808 of FIG. 8 may be operative to generate enabled video content 827 based on disabled video content 811 and private content key 821, and the enabled video content 827 may comprise a watermark 829 defined by private content key 821. In some embodiments, the watermark may comprise a fingerprint that uniquely identifies the enabled video content. In various embodiments, the enabled video content may comprise a copy of a video content item. For example, in some embodiments, enabled video content 827 of FIG. 8 may comprise a copy of a video content item, and watermark 829 may comprise a fingerprint that uniquely identifies that copy of the video content item. The embodiments are not limited to these examples.

Figure 11:
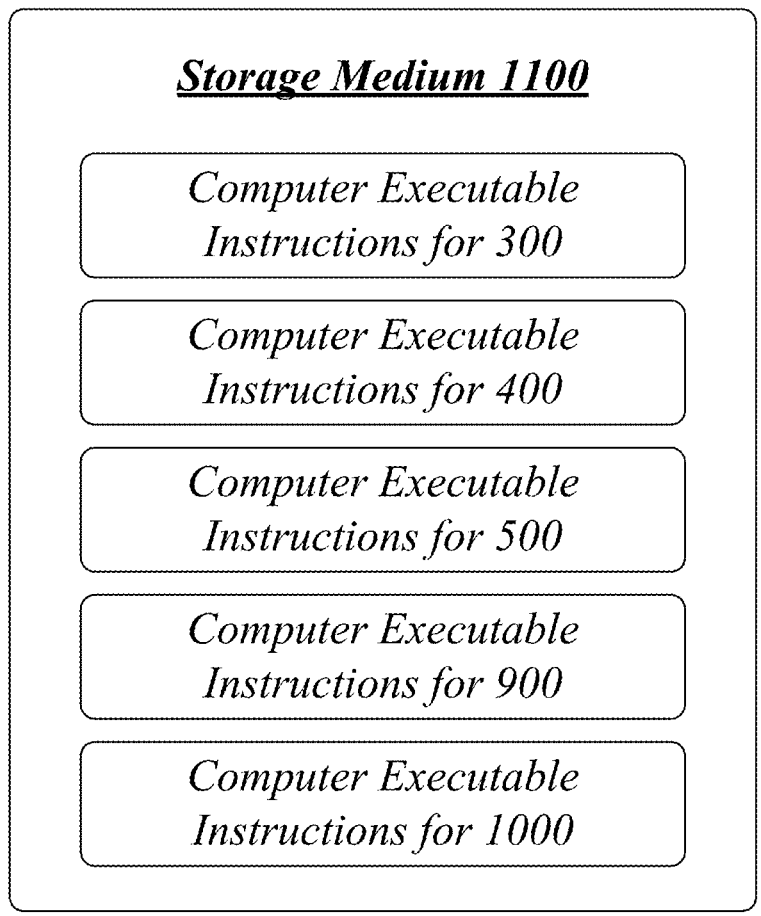
FIG. 11 illustrates one embodiment of a storage medium.

FIG. 11 illustrates an embodiment of a storage medium 1100. Storage medium 1100 may comprise any non-transitory computer-readable storage medium or machine-readable storage medium, such as an optical, magnetic or semiconductor storage medium. In various embodiments, storage medium 1100 may comprise an article of manufacture. In some embodiments, storage medium 1100 may store computer-executable instructions, such as computer-executable instructions to implement one or more logic flows, such as logic flow 300 of FIG. 3, logic flow 400 of FIG. 4, logic flow 500 of FIG. 5, logic flow 900 of FIG. 9, and/or logic flow 1000 of FIG. 10. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 12:
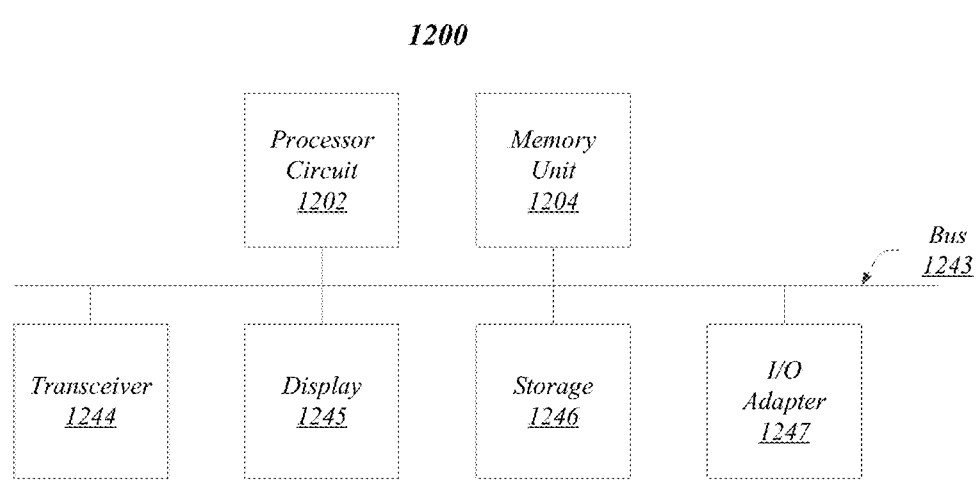
FIG. 12 illustrates one embodiment of a second system.

FIG. 12 illustrates one embodiment of a system 1200. In various embodiments, system 1200 may be representative of a system or architecture suitable for use with one or more embodiments described herein, such as apparatus 200 and/or system 240 of FIG. 2, logic flow 300 of FIG. 3, logic flow 400 of FIG. 4, logic flow 500 of FIG. 5, apparatus 700 of FIG. 7, apparatus 800 of FIG. 8, logic flow 900 of FIG. 9, logic flow 1000 of FIG. 10, and/or storage medium 1100 of FIG. 11. The embodiments are not limited in this respect.

As shown in FIG. 12, system 1200 may include multiple elements. One or more elements may be implemented using one or more circuits, components, registers, processors, software subroutines, modules, or any combination thereof, as desired for a given set of design or performance constraints. Although FIG. 12 shows a limited number of elements in a certain topology by way of example, it can be appreciated that more or less elements in any suitable topology may be used in system 1200 as desired for a given implementation. The embodiments are not limited in this context.

In various embodiments, system 1200 may include a processor circuit 1202. Processor circuit 1202 may be implemented using any processor or logic device, and may be the same as or similar to processor circuit 202 of FIG. 2.

In one embodiment, system 1200 may include a memory unit 1204 to couple to processor circuit 1202. Memory unit 1204 may be coupled to processor circuit 1202 via communications bus 1243, or by a dedicated communications bus between processor circuit 1202 and memory unit 1204, as desired for a given implementation. Memory unit 1204 may be implemented using any machine-readable or computer-readable media capable of storing data, including both volatile and non-volatile memory, and may be the same as or similar to memory unit 204 of FIG. 2. In some embodiments, the machine-readable or computer-readable medium may include a non-transitory medium. The embodiments are not limited in this context.

In various embodiments, system 1200 may include an RF transceiver 1244. RF transceiver 1244 may include one or more radios capable of transmitting and receiving signals using various suitable wireless communications techniques, and may be the same as or similar to RF transceiver 242 of FIG. 2.

In various embodiments, system 1200 may include a display 1245. Display 1245 may comprise any display device capable of displaying information received from processor circuit 1202, and may be the same as or similar to display 245 of FIG. 2. The embodiments are not limited in this context.

In various embodiments, system 1200 may include storage 1246. Storage 1246 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1246 may include technology to increase the storage performance enhanced protection for valuable digital media when multiple hard drives are included, for example. Further examples of storage 1246 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 1200 may include one or more I/O adapters 1247. Examples of I/O adapters 1247 may include Universal Serial Bus (USB) ports/adapters, IEEE 1394 Firewire ports/adapters, and so forth. The embodiments are not limited in this context.

Figure 13:
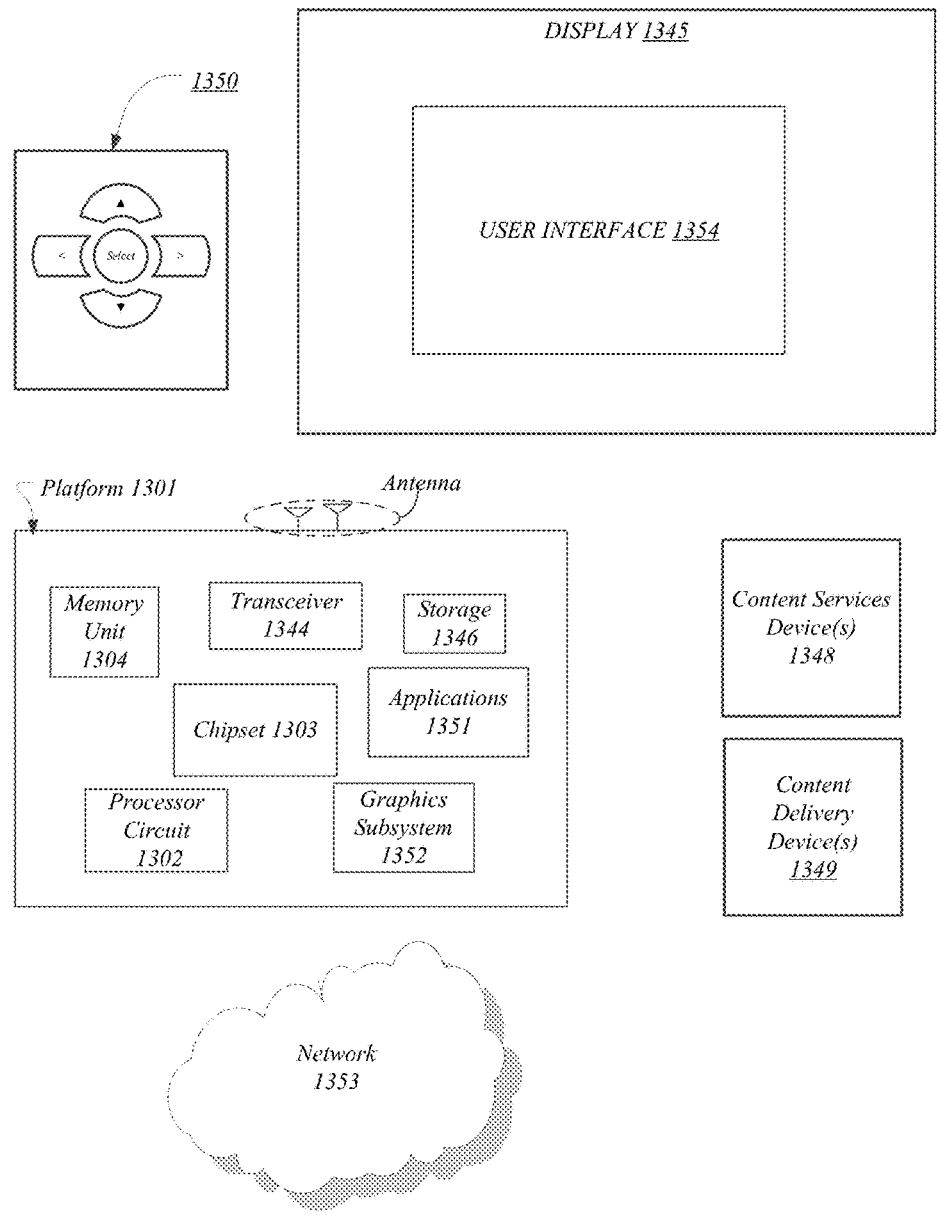
FIG. 13 illustrates one embodiment of a third system.

FIG. 13 illustrates an embodiment of a system 1300. In various embodiments, system 1300 may be representative of a system or architecture suitable for use with one or more embodiments described herein, such as apparatus 200 and/or system 240 of FIG. 2, logic flow 300 of FIG. 3, logic flow 400 of FIG. 4, logic flow 500 of FIG. 5, apparatus 700 of FIG. 7, apparatus 800 of FIG. 8, logic flow 900 of FIG. 9, logic flow 1000 of FIG. 10, storage medium 1100 of FIG. 11, and/or system 1200 of FIG. 12. The embodiments are not limited in this respect.

As shown in FIG. 13, system 1300 may include multiple elements. One or more elements may be implemented using one or more circuits, components, registers, processors, software subroutines, modules, or any combination thereof, as desired for a given set of design or performance constraints. Although FIG. 13 shows a limited number of elements in a certain topology by way of example, it can be appreciated that more or less elements in any suitable topology may be used in system 1300 as desired for a given implementation. The embodiments are not limited in this context.

In embodiments, system 1300 may be a media system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1300 includes a platform 1301 coupled to a display 1345. Platform 1301 may receive content from a content device such as content services device(s) 1348 or content delivery device(s) 1349 or other similar content sources. A navigation controller 1350 including one or more navigation features may be used to interact with, for example, platform 1301 and/or display 1345. Each of these components is described in more detail below.

In embodiments, platform 1301 may include any combination of a processor circuit 1302, chipset 1303, memory unit 1304, transceiver 1344, storage 1346, applications 1351, and/or graphics subsystem 1352. Chipset 1303 may provide intercommunication among processor circuit 1302, memory unit 1304, transceiver 1344, storage 1346, applications 1351, and/or graphics subsystem 1352. For example, chipset 1303 may include a storage adapter (not depicted) capable of providing intercommunication with storage 1346.

Processor circuit 1302 may be implemented using any processor or logic device, and may be the same as or similar to processor circuit 1202 in FIG. 12.

Memory unit 1304 may be implemented using any machine-readable or computer-readable media capable of storing data, and may be the same as or similar to memory unit 1204 in FIG. 12.

Transceiver 1344 may include one or more radios capable of transmitting and receiving signals using various suitable wireless communications techniques, and may be the same as or similar to transceiver 1244 in FIG. 12.

Display 1345 may include any television type monitor or display, and may be the same as or similar to display 1245 in FIG. 12.

Storage 1346 may be implemented as a non-volatile storage device, and may be the same as or similar to storage 1246 in FIG. 12.

Graphics subsystem 1352 may perform processing of images such as still or video for display. Graphics subsystem 1352 may be a graphics processing unit (GPU) or a visual processing unit (VPU), for example. An analog or digital interface may be used to communicatively couple graphics subsystem 1352 and display 1345. For example, the interface may be any of a High-Definition Multimedia Interface, DisplayPort, wireless HDMI, and/or wireless HD compliant techniques. Graphics subsystem 1352 could be integrated into processor circuit 1302 or chipset 1303. Graphics subsystem 1352 could be a stand-alone card communicatively coupled to chipset 1303.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 1348 may be hosted by any national, international and/or independent service and thus accessible to platform 1301 via the Internet, for example. Content services device(s) 1348 may be coupled to platform 1301 and/or to display 1345. Platform 1301 and/or content services device(s) 1348 may be coupled to a network 1353 to communicate (e.g., send and/or receive) media information to and from network 1353. Content delivery device(s) 1349 also may be coupled to platform 1301 and/or to display 1345.

In embodiments, content services device(s) 1348 may include a cable television box, personal computer, network, telephone, Internet enabled devices or appliance capable of delivering digital information and/or content, and any other similar device capable of unidirectionally or bidirectionally communicating content between content providers and platform 1301 and/display 1345, via network 1353 or directly. It will be appreciated that the content may be communicated unidirectionally and/or bidirectionally to and from any one of the components in system 1300 and a content provider via network 1353. Examples of content may include any media information including, for example, video, music, medical and gaming information, and so forth.

Content services device(s) 1348 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 1301 may receive control signals from navigation controller 1350 having one or more navigation features. The navigation features of navigation controller 1350 may be used to interact with a user interface 1354, for example. In embodiments, navigation controller 1350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1350 may be echoed on a display (e.g., display 1345) by movements of a pointer, cursor, focus ring, or other visual indicators displayed on the display. For example, under the control of software applications 1351, the navigation features located on navigation controller 1350 may be mapped to virtual navigation features displayed on user interface 1354. In embodiments, navigation controller 1350 may not be a separate component but integrated into platform 1301 and/or display 1345. Embodiments, however, are not limited to the elements or in the context shown or described herein.

In embodiments, drivers (not shown) may include technology to enable users to instantly turn on and off platform 1301 like a television with the touch of a button after initial boot-up, when enabled, for example. Program logic may allow platform 1301 to stream content to media adaptors or other content services device(s) 1348 or content delivery device(s) 1349 when the platform is turned "off." In addition, chip set 1303 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 1300 may be integrated. For example, platform 1301 and content services device(s) 1348 may be integrated, or platform 1301 and content delivery device(s) 1349 may be integrated, or platform 1301, content services device(s) 1348, and content delivery device(s) 1349 may be integrated, for example. In various embodiments, platform 1301 and display 1345 may be an integrated unit. Display 1345 and content service device(s) 1348 may be integrated, or display 1345 and content delivery device(s) 1349 may be integrated, for example. These examples are not meant to limit the disclosed subject matter.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1301 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
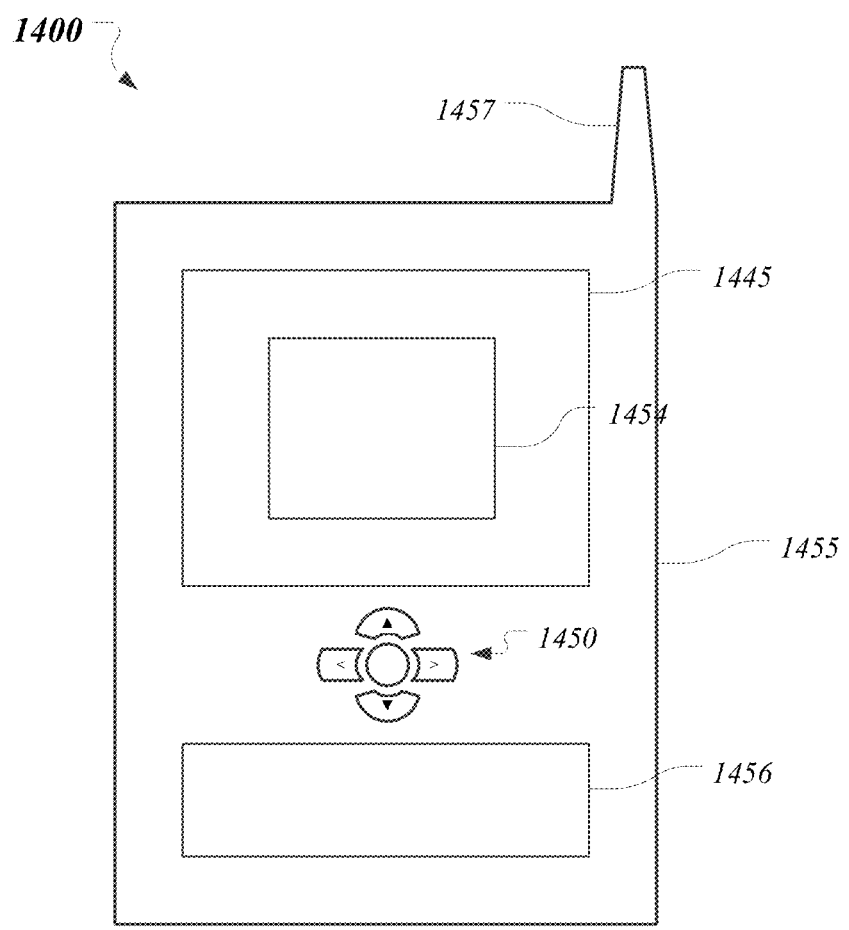
FIG. 14 illustrates one embodiment of a device.

As described above, system 1300 may be embodied in varying physical styles or form factors. FIG. 14 illustrates embodiments of a small form factor device 1400 in which system 1300 may be embodied. In embodiments, for example, device 1400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 1400 may include a display 1445, a navigation controller 1450, a user interface 1454, a housing 1455, an I/O device 1456, and an antenna 1457. Display 1445 may include any suitable display unit for displaying information appropriate for a mobile computing device, and may be the same as or similar to display 1345 in FIG. 13. Navigation controller 1450 may include one or more navigation features which may be used to interact with user interface 1454, and may be the same as or similar to navigation controller 1350 in FIG. 13. I/O device 1456 may include any suitable I/O device for entering information into a mobile computing device. Examples for I/O device 1456 may include an alphanumeric keyboard, a numeric keypad, a touch pad, input keys, buttons, switches, rocker switches, microphones, speakers, voice recognition device and software, and so forth. Information also may be entered into device 1400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a video processing apparatus, comprising: a processor circuit; and a watermarking module for execution by the processor circuit to generate disabled video content through modification of a video content item, send a common stream comprising the disabled video content, and send a private content key for the disabled video content, the private content key defining a watermark for the video content item.

In Example 2, the watermarking module of Example 1 may optionally be for execution by the processor circuit to select content information to be conveyed by the watermark and generate the private content key based on the selected content information.

In Example 3, the watermarking module of any one of Examples 1 to 2 may optionally be for execution by the processor circuit to select a set of watermarking frames from among a plurality of frames in the video content item and select a set of watermarking macroblocks for each of the selected watermarking frames.

In Example 4, the private content key of Example 3 may optionally comprise transform coefficients for one or more watermarking macroblocks.

In Example 5, the watermarking module of any one of Examples 3 to 4 may optionally be for execution by the processor circuit to generate the disabled video content by removing values for one or more watermarking macroblocks in each of the selected watermarking frames.

In Example 6, the watermarking module of Example 5 may optionally be for execution by the processor circuit to generate the private content key using the removed values.

In Example 7, the watermarking module of any one of Examples 3 to 6 may optionally be for execution by the processor circuit to identify, for each selected frame, a set of candidate macroblocks having four or more non-zero transform coefficients, and select the set of watermarking macroblocks for each selected frame from among the set of candidate macroblocks of each selected frame.

In Example 8, the watermark of any one of Examples 1 to 7 may optionally comprise a fingerprint.

In Example 9, the fingerprint of Example 8 may optionally identify a client device authorized to play the video content item.

In Example 10, the video processing apparatus of any one of Examples 1 to 9 may optionally comprise a codec to encode the common stream according to an H.264 compression format.

Example 11 is a system, comprising: a video processing apparatus according to any one of Examples 1 to 10; a display; a radio frequency (RF) transceiver; and one or more RF antennas.

Example 12 is a video processing method, comprising: generating, by a processor circuit, disabled video content through modification of a video content item; sending a common stream comprising the disabled video content; and sending a private content key for the disabled video content, the private content key defining a watermark for the video content item.

In Example 13, the video processing method of Example 12 may optionally comprise: selecting content information to be conveyed by the watermark; and generating the private content key based on the selected content information.

In Example 14, the video processing method of any one of Examples 12 to 13 may optionally comprise: selecting a set of watermarking frames from among a plurality of frames in the video content item; and selecting a set of watermarking macroblocks for each of the selected watermarking frames.

In Example 15, the private content key of Example 14 may optionally comprise transform coefficients for one or more watermarking macroblocks.

In Example 16, the video processing method of any one of Examples 14 to 15 may optionally comprise generating the disabled video content by removing values for one or more watermarking macroblocks in each of the selected watermarking frames.

In Example 17, the video processing method of Example 16 may optionally comprise generating the private content key using the removed values.

In Example 18, the video processing method of any one of Examples 14 to 17 may optionally comprise: identifying, for each selected frame, a set of candidate macroblocks having four or more non-zero transform coefficients; and selecting the set of watermarking macroblocks for each selected frame from among the set of candidate macroblocks of each selected frame.

In Example 19, the watermark of any one of Examples 12 to 18 may optionally comprise a fingerprint.

In Example 20, the fingerprint of Example 19 may optionally identify a client device authorized to play the video content item.

In Example 21, the video processing method of any one of Examples 12 to 20 may optionally comprise encoding the common stream according to an H.264 compression format.

Example 22 is an apparatus, comprising means for performing a video processing method according to any one of Examples 12 to 21.

Example 23 is a system, comprising: an apparatus according to Example 22; and a display.

Example 24 is a system, comprising: an apparatus according to Example 22; and one or more radio frequency (RF) transceivers.

Example 25 is a communications device arranged to perform a video processing method according to any one of Examples 12 to 21.

Example 26 is at least one machine-readable medium comprising a set of video processing instructions that, in response to being executed on a computing device, cause the computing device to: generate, by a processor circuit, disabled video content through modification of a video content item; send a common stream comprising the disabled video content; and send a private content key for the disabled video content, the private content key defining a watermark for the video content item.

In Example 27, the at least one machine-readable medium of Example 26 may optionally comprise video processing instructions that, in response to being executed on the computing device, cause the computing device to: select content information to be conveyed by the watermark; and generate the private content key based on the selected content information.

In Example 28, the at least one machine-readable medium of any one of Examples 26 to 27 may optionally comprise video processing instructions that, in response to being executed on the computing device, cause the computing device to: select a set of watermarking frames from among a plurality of frames in the video content item; and select a set of watermarking macroblocks for each of the selected watermarking frames.

In Example 29, the private content key of Example 28 may optionally comprise transform coefficients for one or more watermarking macroblocks.

In Example 30, the at least one machine-readable medium of any one of Examples 28 to 29 may optionally comprise video processing instructions that, in response to being executed on the computing device, cause the computing device to generate the disabled video content by removing values for one or more watermarking macroblocks in each of the selected watermarking frames.

In Example 31, the at least one machine-readable medium of Example 30 may optionally comprise video processing instructions that, in response to being executed on the computing device, cause the computing device to generate the private content key using the removed values.

In Example 32, the at least one machine-readable medium of any one of Examples 28 to 31 may optionally comprise video processing instructions that, in response to being executed on the computing device, cause the computing device to: identify, for each selected frame, a set of candidate macroblocks having four or more non-zero transform coefficients; and select the set of watermarking macroblocks for each selected frame from among the set of candidate macroblocks of each selected frame.

In Example 33, the watermark of any one of Examples 26 to 32 may optionally comprise a fingerprint.

In Example 34, the fingerprint of Example 33 may optionally identify a client device authorized to play the video content item.

In Example 35, the at least one machine-readable medium of any one of Examples 26 to 34 may optionally comprise video processing instructions that, in response to being executed on the computing device, cause the computing device to encode the common stream according to an H.264 compression format.

Example 36 is a video processing apparatus, comprising: a processor circuit; and a watermarking module for execution by the processor circuit to receive disabled video content and a private content key for the disabled video content and generate enabled video content based on the disabled video content and the private content key, the enabled video content comprising a watermark defined by the private content key.

In Example 37, the watermarking module of Example 36 may optionally be for execution by the processor circuit to receive the disabled video content via a common stream and receive the private content key via a private stream.

In Example 38, the common stream of Example 37 may optionally comprise a multicast stream or a broadcast stream.

In Example 39, the private content key of any one of Examples 36 to 38 may optionally indicate a set of modifications to be performed for one or more macroblocks in one or more frames of the disabled video content.

In Example 40, the set of modifications of Example 39 may optionally include modifications to one or more quantized discrete cosine transform (QDCT) coefficients for at least one macroblock.

In Example 41, the disabled video content of any one of Examples 36 to 40 may optionally comprise zeroed motion vectors for one or more inter-predicted macroblocks.

In Example 42, the disabled video content of any one of Examples 36 to 41 may optionally comprise zeroed transform coefficients for one or more inter-predicted macroblocks.

In Example 43, the watermark of any one of Examples 36 to 42 may optionally comprise a fingerprint that uniquely identifies the enabled video content.

In Example 44, the fingerprint of Example 43 may optionally identify a client device authorized to play the enabled video content.

In Example 45, the video processing apparatus of any one of Examples 36 to 44 may optionally comprise a codec to decode the disabled video content according to an H.264 compression format.

Example 46 is a system, comprising: a video processing apparatus according to any one of Examples 36 to 45; a display; a radio frequency (RF) transceiver; and one or more RF antennas.

Example 47 is a video processing method, comprising: receiving disabled video content and a private content key for the disabled video content; and generating enabled video content based on the disabled video content and the private content key, the enabled video content comprising a watermark defined by the private content key.

In Example 48, the video processing method of Example 47 may optionally comprise: receiving the disabled video content via a common stream; and receiving the private content key via a private stream.

In Example 49, the common stream of Example 48 may optionally comprise a multicast stream or a broadcast stream.

In Example 50, the private content key of any one of Examples 47 to 49 may optionally indicate a set of modifications to be performed for one or more macroblocks in one or more frames of the disabled video content.

In Example 51, the set of modifications of Example 50 may optionally include modifications to one or more quantized discrete cosine transform (QDCT) coefficients for at least one macroblock.

In Example 52, the disabled video content of any one of Examples 47 to 51 may optionally comprise zeroed motion vectors for one or more inter-predicted macroblocks.

In Example 53, the disabled video content of any one of Examples 47 to 52 may optionally comprise zeroed transform coefficients for one or more inter-predicted macroblocks.

In Example 54, the watermark of any one of Examples 47 to 53 may optionally comprise a fingerprint that uniquely identifies the enabled video content.

In Example 55, the fingerprint of Example 54 may optionally identify a client device authorized to play the enabled video content.

In Example 56, the video processing method of any one of Examples 47 to 55 may optionally comprise decoding the disabled video content according to an H.264 compression format.

Example 57 is an apparatus, comprising means for performing a video processing method according to any one of Examples 47 to 56.

Example 58 is a system, comprising: an apparatus according to Example 57; and a display.

Example 59 is a system, comprising: an apparatus according to Example 57; and one or more radio frequency (RF) transceivers.

Example 60 is a communications device arranged to perform a video processing method according to any one of Examples 47 to 56.

Example 61 is at least one machine-readable medium comprising a set of video processing instructions that, in response to being executed on a computing device, cause the computing device to: receive disabled video content and a private content key for the disabled video content; and generate enabled video content based on the disabled video content and the private content key, the enabled video content comprising a watermark defined by the private content key.

In Example 62, the at least one machine-readable medium of Example 61 may optionally comprise a set of video processing instructions that, in response to being executed on a computing device, cause the computing device to: receive the disabled video content via a common stream; and receive the private content key via a private stream.

In Example 63, the common stream of Example 62 may optionally comprise a multicast stream or a broadcast stream.

In Example 64, the private content key of any one of Examples 61 to 63 may optionally indicate a set of modifications to be performed for one or more macroblocks in one or more frames of the disabled video content.

In Example 65, the set of modifications of Example 64 may optionally include modifications to one or more quantized discrete cosine transform (QDCT) coefficients for at least one macroblock.

In Example 66, the disabled video content of any one of Examples 61 to 65 may optionally comprise zeroed motion vectors for one or more inter-predicted macroblocks.

In Example 67, the disabled video content of any one of Examples 61 to 66 may optionally comprise zeroed transform coefficients for one or more inter-predicted macroblocks.

In Example 68, the watermark of any one of Examples 61 to 67 may optionally comprise a fingerprint that uniquely identifies the enabled video content.

In Example 69, the fingerprint of Example 68 may optionally identify a client device authorized to play the enabled video content.

In Example 70, the at least one machine-readable medium of any one of Examples 61 to 69 may optionally comprise a set of video processing instructions that, in response to being executed on a computing device, cause the computing device to decode the disabled video content according to an H.264 compression format.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   a processor circuit; and
   a non-transitory computer-readable storage medium comprising instructions for execution by the processor circuit to:
   generate disabled video content through modification of a video content item, send a common stream comprising the disabled video content, to select content information to be conveyed by a watermark and generate a private content key based on the selected content information, the content information comprising one or more characteristics of the video content item, and send the private content key for the disabled video content, the private content key defining the watermark for the video content item,
   select a set of watermarking frames from among a plurality of frames in the video content item and select a set of watermarking macroblocks for each of the selected watermarking frames,
   generate the disabled video content by removing values for one or more watermarking macroblocks in each of the selected watermarking frames, and
   generate the private content key using the removed values.

2. The apparatus of claim 1, the private content key comprising transform coefficients for one or more watermarking macroblocks.

3. The apparatus of claim 1, the non-transitory computer-readable storage medium comprising instructions for execution by the processor circuit to identify, for each selected frame, a set of candidate macroblocks having four or more non-zero transform coefficients, and select the set of watermarking macroblocks for each selected frame from among the set of candidate macroblocks of each selected frame.

4. The apparatus of claim 1, the watermark comprising a fingerprint.

5. The apparatus of claim 1, comprising:
   a display;
   a radio frequency (RF) transceiver; and
   one or more RF antennas.

6. A method, comprising:
   generating, by a processor circuit, disabled video content through modification of a video content item;
   sending a common stream comprising the disabled video content;
   selecting content information to be conveyed by a watermark, the content information comprising one or more characteristics of the video content item; and
   generating a private content key based on the selected content information;
   sending the private content key for the disabled video content, the private content key defining the watermark for the video content item;
   selecting a set of watermarking frames from among a plurality of frames in the video content item;
   selecting a set of watermarking macroblocks for each of the selected watermarking frames;
   generating the disabled video content by removing values for one or more watermarking macroblocks in each of the selected watermarking frames;
   generating the private content key using the removed values.

7. The method of claim 6, the private content key comprising transform coefficients for one or more watermarking macroblocks.

8. The method of claim 6, comprising:
   identifying, for each selected frame, a set of candidate macroblocks having four or more non-zero transform coefficients; and
   selecting the set of watermarking macroblocks for each selected frame from among the set of candidate macroblocks of each selected frame.

9. The method of claim 6, the watermark comprising a fingerprint.

10. An apparatus, comprising:
    a processor circuit; and
    a non-transitory computer-readable storage medium comprising instructions for execution by the processor circuit to receive disabled video content and a private content key for the disabled video content and generate enabled video content based on the disabled video content and the private content key, the enabled video content comprising a watermark defined by the private content key, the private content key based on selected content information conveyed by the watermark the content information comprising one or more characteristics of the video content item, the private content key indicating a set of modifications to be performed for one or more macroblocks in one or more frames of the disabled video content, the set of modifications including modifications to one or more quantized discrete cosine transform (QDCT) coefficients for at least one macroblock.

11. The apparatus of claim 10, the non-transitory computer-readable storage medium comprising instructions for execution by the processor circuit to receive the disabled video content via a common stream and receive the private content key via a private stream.

12. The apparatus of claim 11, the common stream comprising a multicast stream or a broadcast stream.

13. The apparatus of claim 10, the disabled video content comprising zeroed motion vectors for one or more inter-predicted macroblocks.

14. The apparatus of claim 10, the watermark comprising a fingerprint that uniquely identifies the enabled video content.

15. The apparatus of claim 10, comprising:
a display;
a radio frequency (RF) transceiver; and
one or more RF antennas.

* * * * *